US009360380B2

(12) United States Patent
Tonina et al.

(10) Patent No.: US 9,360,380 B2
(45) Date of Patent: Jun. 7, 2016

(54) METHOD AND APPARATUS FOR MONITORING WATERBED ENVIRONMENT USING TEMPERATURE MEASUREMENTS

(71) Applicants: University of Idaho, Boise, ID (US); U.S. Department of Agriculture, Washington, DC (US)

(72) Inventors: Daniele Tonina, Boise, ID (US); Charles H. Luce, Boise, ID (US); Frank Gariglio, Boise, ID (US)

(73) Assignees: University of Idaho, Moscow, ID (US); The United States of America as Represented by the Secretary of Agriculture, Washington, DC (US)

( * ) Notice: Subject to any disclaimer, the term of this patent is extended or adjusted under 35 U.S.C. 154(b) by 497 days.

(21) Appl. No.: 13/890,919

(22) Filed: May 9, 2013

(65) Prior Publication Data

US 2013/0301672 A1 Nov. 14, 2013

Related U.S. Application Data

(60) Provisional application No. 61/644,580, filed on May 9, 2012.

(51) Int. Cl.
*G01K 13/02* (2006.01)
*G01K 1/02* (2006.01)
*G01F 23/24* (2006.01)

(52) U.S. Cl.
CPC .............. *G01K 13/02* (2013.01); *G01F 23/246* (2013.01); *G01F 23/247* (2013.01); *G01F 23/248* (2013.01); *G01K 1/02* (2013.01)

(58) Field of Classification Search
CPC ........ G01K 13/02; G01K 1/02; G01F 23/246; G01F 23/247; G01F 23/248
USPC ....................................................... 374/45, 136
See application file for complete search history.

(56) References Cited

U.S. PATENT DOCUMENTS

| 5,349,327 | A | * | 9/1994 | Waters | .................... | E01D 19/02 |
| | | | | | | 324/71.2 |
| 7,832,274 | B1 | * | 11/2010 | Mercado | .............. | G01N 29/043 |
| | | | | | | 73/594 |
| 2010/0206067 | A1 | * | 8/2010 | Cigada | .................... | G01F 23/22 |
| | | | | | | 73/295 |
| 2011/0012728 | A1 | * | 1/2011 | McCane | ............... | G01S 5/0027 |
| | | | | | | 340/539.1 |

* cited by examiner

*Primary Examiner* — Lisa Caputo
*Assistant Examiner* — Philip Cotey
(74) *Attorney, Agent, or Firm* — Klarquist Sparkman, LLP

(57) ABSTRACT

A method and apparatus for monitoring waterbed environment are described. The method may comprise determining a first temperature at a location within the water column of a surface body of water that is representative of the upper thermal boundary condition between surface water and pore water environments, and determining at least a second temperature at the location at a first depth below a waterbed surface. The first and second temperatures are then used to monitor a waterbed environment. Certain embodiments are particularly useful for monitoring spatiotemporal variations of riverbed surface elevations, such as scour and deposition, over a time period. Probe/sensor assemblies are disclosed for practicing the method.

24 Claims, 25 Drawing Sheets

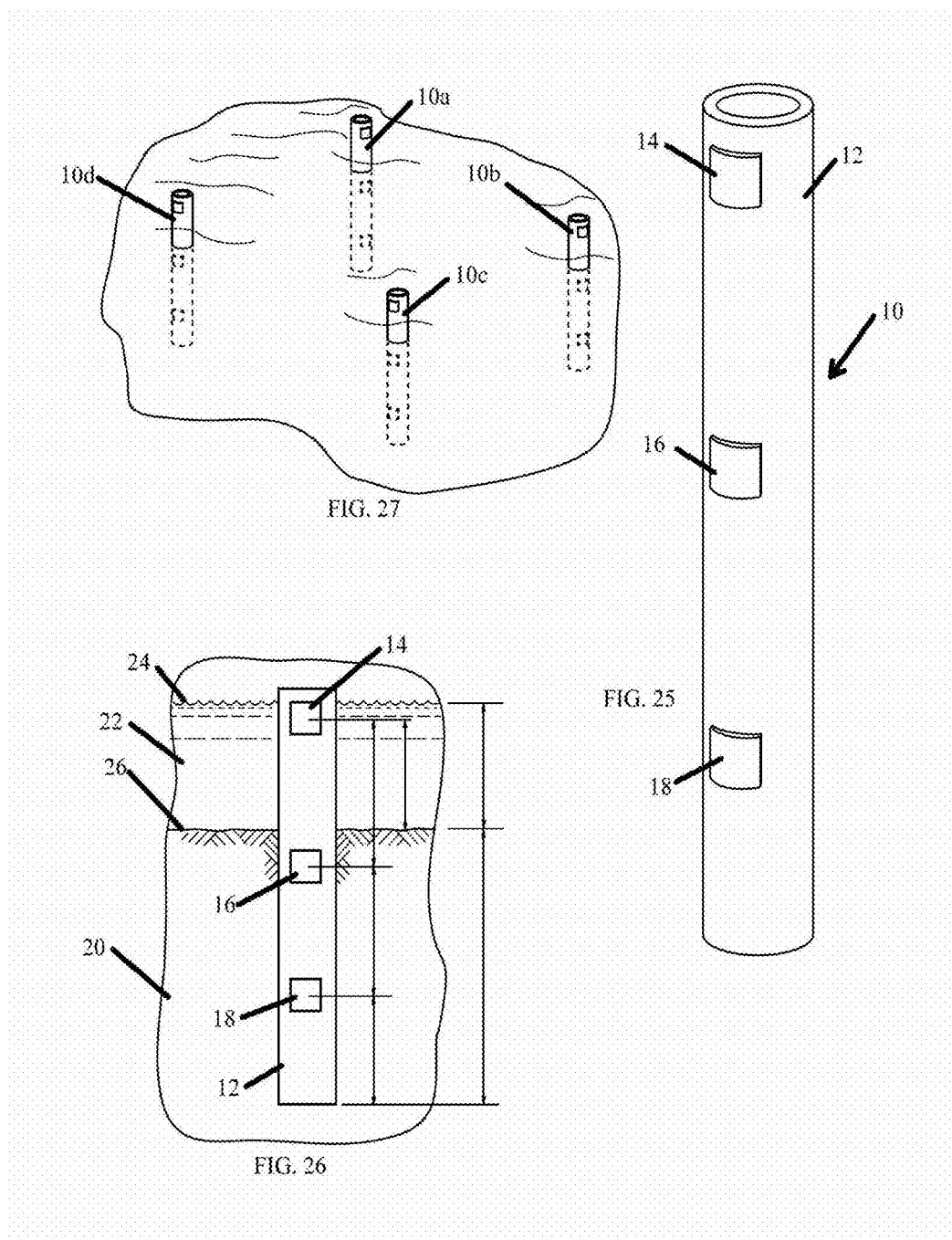

METHOD AND APPARATUS FOR MONITORING WATERBED ENVIRONMENT USING TEMPERATURE MEASUREMENTS

CROSS REFERENCE TO RELATED APPLICATION

This application claims the benefit of the earlier filing date of U.S. provisional application No. 61/644,580, filed on May 9, 2012, which is incorporated herein by reference in its entirety.

ACKNOWLEDGMENT OF GOVERNMENT SUPPORT

This invention was made with government support from the U.S. Forest Service, Department of Agriculture, under contract number 10-JV-11221634-247. The federal government has certain rights in the invention.

FIELD

Disclosed embodiments concern a method for monitoring waterbed environment, such as monitoring scour depth or deposition thickness in a riverbed, and a probe/sensor assembly for practicing the method.

BACKGROUND

Heat transport of naturally occurring temperature differences between stream and streambed pore waters results from advection, due to intra-gravel flows, conduction through the sediment and fluid matrix and diffusion [Anderson, 2005]. For the last several decades, temperature has been used as a tracer to quantify water fluxes into streambed sediments [Bredehoeft and Papadopulos, 1965; Constantz and Thomas, 1996; 1997; Goto et al., 2005; Stallman, 1960; 1965] and hyporheic exchange [Gordon et al., 2012; Hatch et al., 2006; Keery et al., 2007; Swanson and Cardenas, 2010]. Temperature also has been used to investigate discharge losses in streams [Constantz and Thomas, 1996; 1997], and interaction with riparian vegetation [Constantz et al., 1994].

A primary engineering issue associated with bodies of water is the spatiotemporal changes that occur in the waterbed surface, such as changes resulting from scouring and deposition processes. As an example, changes associated with scour adjacent a pier can undermine the structural integrity of the pier. Methods have been developed to address these issues, such as acoustic techniques for monitoring waterbed environment. However, these known methods require elaborate and expensive equipment. Accordingly, a need exists for a robust and inexpensive apparatus and method for monitoring waterbed environment changes.

SUMMARY

Disclosed embodiments address the need for a robust and inexpensive apparatus and method for monitoring waterbed environment changes. One disclosed embodiment for monitoring waterbed environment comprises determining a first temperature at a location substantially adjacent the surface of a body of water, and more particularly within the water column of a surface body of water that is representative of the upper thermal boundary condition between surface water and pore water environments. The method further comprises determining at least a second temperature at the location at a first depth below a waterbed surface. The first and second temperatures are then used to determine change in the waterbed environment. The method can also comprise determining at least a third temperature at a location at a second depth below the waterbed surface. Temperatures are suitably determined using temperature sensors, with certain working embodiments having used temperature sensors that stored temperature data over time. Temperature sensors that transmit temperature data to a remote receiving station also can be used. The sensors can be coupled to a computer for receiving temperature data, storing temperature data, and/or analyzing temperature data.

While the waterbed can be that of a stream/river, canal, pond, lake or ocean, working embodiments are illustrated herein with reference to a riverbed. Monitoring the riverbed environment includes, by way of example, monitoring hyporheic vertical flux, hyporheic thermal regime, waterbed effective thermal diffusivity, change in waterbed elevation, and combinations thereof. Generally pools in rivers "scour" and deepen during high flows and refill during low flows. Accordingly, certain embodiments are particularly useful for monitoring spatiotemporal variations of riverbed surface elevations, such as scour and deposition, over a time period. A number of important commercial applications are currently known, including monitoring scour around bridge piers placed in streams (or any other water body). A second commercial embodiment concerns measuring seepage losses and bed scour in irrigation canals in agriculture areas.

Certain embodiments comprise using a probe that includes plural temperature sensors to form a probe/sensor assembly. The probe is inserted into a waterbed to position a first sensor at a location substantially adjacent the surface of a body of water, and more particularly within the water column of a surface body of water that is representative of the upper thermal boundary condition between surface water and pore water environments, and to position at least a second temperature sensor at a known depth relative to a waterbed surface. Plural temperature sensors or plural probe/sensor assemblies can be arranged in an array.

Certain disclosed probe/sensor assemblies comprise a probe and at least a first temperature sensor associated with the probe for positioning the first temperature sensor appropriately in a water column, and at least a second temperature sensor associated with the probe for positioning the second temperature sensor at a known depth below a waterbed surface. Probe/sensor assemblies can include at least a third temperature sensor associated with the probe for locating the third temperature sensor at a second known depth below the waterbed surface. Again, the probe/sensor assembly can include temperature sensors that record temperature readings at known intervals for a desired time period, and/or the temperature sensors can transmit data to a remote receiving station at selected time intervals, or continuously in real time. Moreover, certain embodiments further comprise a computer associated with the probe/sensor assembly to receive data, to store data, and/or for data analysis, such as to calculate a change in waterbed depth over a time period.

The foregoing and other objects, features, and advantages of the invention will become more apparent from the following detailed description, which proceeds with reference to the accompanying figures.

BRIEF DESCRIPTION OF THE DRAWINGS

FIG. 24 illustrates the definition of amplitude ($A_1$ and $A_2$), amplitude ratio ($A_r$), phase ($\phi_1$ and $\phi_2$) and phase shift ($\Delta\phi$) with the temperature signal of the in-stream water (sensor 1) and of the pore water (sensor 2), wherein the phase is in radians.

FIG. 25 illustrates one embodiment of a probe/sensor assembly according to the present invention.

FIG. 26 illustrates a probe/sensor assembly inserted into a waterbed.

FIG. 27 illustrates an array of probe/sensor assemblies in a water body.

DETAILED DESCRIPTION

I. Terms

Figure 1:
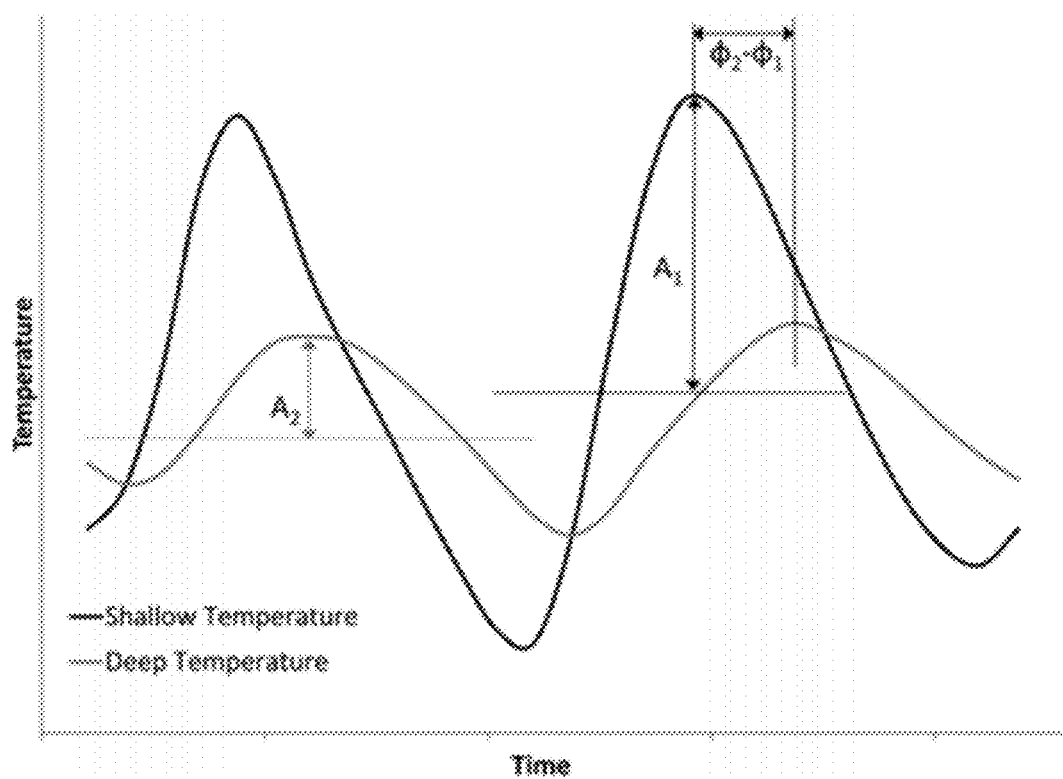
FIG. 1 is a schematic drawing that defines the amplitude ratio ($A_2/A_1$) and $\Delta_\phi = \phi_2 - \phi_1$ ($\Delta_\phi$ in radians) drawn on observed time series.

Unless otherwise explained, all technical and scientific terms used herein have the same meaning as commonly understood by a person of ordinary skill in the art to which this disclosure belongs.

The singular terms "a," "an," and "the" include plural referents unless context clearly indicates otherwise.

Similarly, the word "or" is intended to include "and" unless the context clearly indicates otherwise.

In the following description, like reference characters designate like or corresponding parts throughout the several views shown in the figures. Terms such as "top," "bottom," "outward," "inward," and the like are words of convenience and are not to be construed as limiting terms.

The term "comprises" means "includes." In addition, whenever a group is described as either comprising or consisting of at least one of a group of elements and combinations thereof, it is understood that the group may comprise or consist of any number of those elements recited, either individually or in combination with each other.

All publications, patent applications, patents, and other references mentioned herein are incorporated by reference in their entirety.

Although methods and materials similar or equivalent to those described herein can be used in the practice or testing of this disclosure, suitable methods and materials are described below.

II. Mathematical Basis

Vertical heat fluxes through a stream bottom are generally considered to result from the combination of conduction and convection. The governing partial differential equation (PDE) is derived from conservation of energy, where the change in heat storage can be broken down into the divergences of the conductive and advective fluxes.

$$\rho_m c_m \frac{\partial T}{\partial t} = \lambda_m \frac{\partial^2 T}{\partial z^2} - q \rho_w c_w \frac{\partial T}{\partial z} \tag{2}$$

Where the subscript m denotes the sediment-water system, and w indicates the water, which is the moving portion of the system [Stallman, 1965]. Furthermore, T=temperature (° C.); t=time (s); z=depth into the streambed (m), positive downward; q=Darcian fluid velocity or seepage flux (m s$^{-1}$) (positive flux is downward); $\rho$=the density of the specified medium (water or sediment-water matrix) (kg m$^{-3}$); c=the specific heat of specified medium (water or sediment-water matrix) (J kg$^{-1}$ ° C.$^{-1}$); and $\lambda_m$=thermal conductivity of the sediment-water matrix (W m$^{-1}$ ° C.$^{-1}$)

This can be rearranged into the one-dimensional advection-diffusion equation:

$$\frac{\partial T}{\partial t} = \kappa_e \frac{\partial^2 T}{\partial z^2} - v_t \frac{\partial T}{\partial z} \tag{3}$$

[Suzuki, 1960]. Equation 3 summarizes all of the constants in equation (2) into two parameters: one related to heat transport via diffusion and the other to heat transport by movement of the fluid. These two parameters are related to the previously listed constants by:

$$\kappa_e = \text{effective thermal diffusivity (m}^2\text{s}^{-1}) \tag{4}$$

$$\kappa_e = \frac{\lambda_m}{\rho_m c_m}$$

While the effects of dispersivity caused by microeddies in the fluid as it moves through pores is commonly included with the effective thermal diffusivity [Hatch et al., 2006; Keery et al., 2007], it is neglected here in view of the issues associated with identifying the effects of dispersion and diffusion [M P Anderson, 2005].

$v_t$=the areally averaged rate of heat movement induced by movement of water through the bed (m s$^{-1}$) (positive flux is downward); $v_t$ is related to the areally averaged water velocity by $$v_t = q \frac{\rho_w c_w}{\rho_m c_m} \tag{5}$$

While $v_t$ is sometimes referred to as the "thermal front velocity," that terminology can be confusing, as the term is actually separate from, and independent of, conductive thermal fluxes. Because phase velocities for the diurnal temperature wave are derived subsequently, including both the diffusive and advective components, that look much more like "front velocities," the phrase "advective thermal velocity" is adopted for $v_t$.

During some months of the year, when streams are not ice covered for instance, the boundary condition of interest is a diurnally varying temperature in the stream water with daily average temperature, $T_\mu$, at the top $$T(0,t) = T_\mu + A \cos(\omega t) \tag{6a}$$

and a semi-infinite domain with $$\lim_{z \to \infty} T(z, t) = T_\mu \tag{6b}$$

where: A=magnitude of diurnal temperature amplitude at the surface (° C.), $\omega$=angular frequency for diurnal frequency (s$^{-1}$), or $$\omega = \frac{2\pi}{P} \tag{7}$$

P=period of the oscillation (s), 1 day in the case of diurnal variations.

The PDE (3) has a solution $$T(z, t) = T_\mu + A e^{-az} \cos(\omega t - bz) \tag{8}$$

with $$a = \frac{1}{2\kappa_e} \left( \sqrt{\frac{\sqrt{v_t^4 + (4\omega\kappa_e)^2} + v_t^2}{2}} - v_t \right) \tag{9}$$

and $$b = \frac{1}{2\kappa_e} \sqrt{\frac{\sqrt{v_t^4 + (4\omega\kappa_e)^2} - v_t^2}{2}} \tag{10}$$

[Goto et al., 2005; Hatch et al., 2006; Keery et al., 2007; Stallman, 1965]. These two parameters can be estimated from two time series of temperature measurements taken at two depths, here denoted with 1 for the shallower sensor, at a first depth $z_1$, and 2 for the more deeply buried sensor, at a second depth $z_2$ (see FIG. 1 for definition). The term a may be approximated by the ratio of the daily temperature ranges (amplitude) measured the two depths divided by the vertical distance between the sensors $$a \approx \frac{-\ln\left(\frac{A_2}{A_1}\right)}{(z_2 - z_1)} = \frac{-\ln\left(\frac{A_2}{A_1}\right)}{\Delta z} \quad (11)$$

The parameter b can be estimated from the difference in the timing of the diurnal oscillation at each depth, given as the difference in the phase, $\phi$ (here in angular units, e.g. radians), of the diurnal temperature wave at each depth, again divided by the vertical distance between sensors 1 and 2.

$$b \approx \frac{\phi_2 - \phi_1}{(z_2 - z_1)} = \frac{\phi_2 - \phi_1}{\Delta z} \quad (12)$$

Fluid velocity has commonly been estimated based on equations (9-12) using a-priori estimates of the bulk thermal diffusivity [e.g. Hatch et al., 2006].

For a given sinusoidal time series, the amplitude ratio and phase difference can be determined using a variety of techniques. For example, a 24-hour period can be used to compare temperature ranges and the difference in timing of peaks, noting that $\phi$ is in angular units with $2\pi$ radians in a 24-hour period. Isolating a period of several days with a relatively consistent pattern, a Fourier transform can be applied to the data and the effective amplitude and phase isolated for each sinusoidal time series [e.g. Luce and Tarboton, 2010]. Dynamic harmonic regression using the Captain Toolbox [Taylor et al., 2007] also can be used to obtain phase and amplitude estimates for diurnal patterns in the temperature time series on a continuous time basis.

A. Derivation of Non-Dimensional Form

Under strictly diffusive conditions, specifically when $v_t=0$, two useful variables can be defined that relate to the diffusivity of the medium: $z_d$ and $v_d$. The variable $z_d$ is the diurnal damping depth, the depth at which the amplitude of daily temperature oscillations are 1/e of those at the surface [e.g. Carslaw and Jaeger, 1959; Luce and Tarboton, 2010; Stallman, 1965].

$$z_d = \sqrt{\frac{2\kappa_e}{\omega}} \quad (13)$$

The phase velocity of the diffusive temperature wave into the streambed is $$v_d = \sqrt{2\omega\kappa_e} \quad (14)$$

The partial differential equation (3) and boundary condition (6) can be non-dimensionalized using the following dimensionless variables $$U = \frac{T - T_\mu}{A} \quad (15a)$$

$$\tau = \omega t \quad (15b)$$

$$x = \frac{z}{z_d} = \frac{z}{\sqrt{\frac{2\kappa_e}{\omega}}} \quad (15c)$$

Differentiating provides:

$$\partial T = A \partial U \quad (16a)$$

$$\partial t = \frac{\partial \tau}{\omega} \quad (16a)$$

$$\partial z = \sqrt{\frac{2\kappa_e}{\omega}} \, \partial x \quad (16a)$$

which can be substituted directly into (3), yielding $$\frac{\omega A \partial U}{\partial \tau} = \kappa_e \frac{A \partial^2 U}{\left(\frac{2\kappa_e}{\omega}\right) \partial x^2} - v_t \frac{A \partial U}{\sqrt{\frac{2\kappa_e}{\omega}} \, \partial x} \quad (17)$$

which simplifies to $$\frac{\partial U}{\partial \tau} = \frac{\partial^2 U}{\partial x^2} - v_t \frac{\partial U}{\sqrt{2\omega\kappa_e} \, \partial x} \quad (18)$$

or $$\frac{\partial U}{\partial \tau} = \frac{1}{2}\frac{\partial^2 U}{\partial x^2} - \frac{v_t}{v_d}\frac{\partial U}{\partial x} \quad (19)$$

If a dimensionless advective thermal velocity is defined:

$$v_* = \frac{v_t}{v_d} \quad (20)$$

then (19) further simplifies to $$\frac{\partial U}{\partial \tau} = \frac{1}{2}\frac{\partial^2 U}{\partial x^2} - v_*\frac{\partial U}{\partial x} \quad (21)$$

And the boundary conditions become $$U(0, t) = \cos\tau \quad (22a)$$

$$\lim_{x\to\infty} U(x, t) = 0 \quad (22b)$$

showing that the advection-diffusion equation with sinusoidal boundary conditions can be characterized with one parameter related to the ratio of the advective thermal velocity to the square root of thermal diffusivity.

The relative contribution of the fluid velocity and diffusion to thermal transfer is given by the thermal Peclet number, $P_e$ [M P Anderson, 2005], which is readily identified as the ratio of the coefficients for the advective and diffusive terms in the PDE (21), v*/(½). For the prescribed boundary conditions, the diffusive propagation of the daily temperature "wave" provides a characteristic velocity and time. This can be viewed as a particular Peclet number with the advective thermal velocity, $v_t$, as the scaling velocity and the thermal damping depth, $z_d$, as the scaling length. Alternatively, it may be viewed with $1/\omega$ as a scaling time.

$$P_e = 2v_* = 2\frac{v_t}{v_d} = \frac{2v_t}{\sqrt{2\omega\kappa_e}} = \frac{2v_t z_d}{\sqrt{2\omega\kappa_e}\sqrt{\frac{2\kappa_e}{\omega}}} = \frac{v_t z_d}{\kappa_e} \quad (23)$$

B. Solutions to the Non-Dimensional Form

The partial differential equation (21) has solution in the form $$U(\tau,x) = e^{-\alpha x}\cos(\tau - \beta x) \quad (24)$$

where $\alpha$ is the scaled amplitude damping rate (per unit scaled depth) parameter and $\beta$ is the scaled phase shift rate parameter. This solution automatically meets the first boundary condition (22a) regardless of parameters and satisfies the second boundary condition (22b) when $\alpha > 0$.

U is the time series of temperature anomalies from the mean normalized by the daily temperature amplitude (centered and scaled temperature). The value of a can be estimated from a Fourier analysis of either the centered and scaled temperature time series (U) or the raw temperature time series (T) by looking at the ratio of the amplitudes at two different depths divided by the rescaled depths, similar to approaches described earlier.

$$\alpha \approx \frac{-\ln\left(\frac{A_2}{A_1}\right)}{x_2 - x_1} = \frac{-\ln(A_r)}{\Delta x} \quad (25)$$

Where $A_2$ and $A_1$ are the diurnal temperature amplitude at rescaled-depths $x_2$ and $x_1$ respectively. Similarly the phase rate parameters can be estimated from the change in phase of either U or T, $$\beta \approx \frac{\phi_2 - \phi_1}{x_2 - x_1} = \frac{\Delta\phi}{\Delta x} \quad (26)$$

For tracking differences between the dimensionless and original solutions, $$\alpha x = \alpha z \text{ and } \beta x = bz \quad (27)$$

The remainder of this section discusses how to apply these parameter estimates to estimate the velocity and diffusivity parameters in the original PDEs (3) and (21).

From the solution (24) the following derivatives can be written that are used in PDE (21)

$$\frac{\partial U}{\partial \tau} = -e^{-\alpha x}\sin(\tau - \beta x) \quad (28a)$$

$$\frac{\partial U}{\partial x} = -\alpha e^{-\alpha x}\cos(\tau - \beta x) + \beta e^{-\alpha x}\sin(\tau - \beta x) \quad (28b)$$

$$\frac{\partial^2 U}{\partial x^2} = (\alpha^2 - \beta^2)e^{-\alpha x}\cos(\tau - \beta x) - 2\alpha\beta e^{-\alpha x}\sin(\tau - \beta x) \quad (28c)$$

Substituting these into equation (21) yields $$-e^{-\alpha x}\sin(\tau - \beta x) - v_*[-\alpha e^{-\alpha x}\cos(\tau - \beta x) + \beta e^{-\alpha x}\sin(\tau - \beta x)]$$

$$-e^{-\alpha x}\sin(\tau - \beta x) = \quad (29)$$

$$\frac{1}{2}[(\alpha^2 - \beta^2)e^{-\alpha x}\cos(\tau - \beta x) - 2\alpha\beta e^{-\alpha x}\sin(\tau - \beta x)] -$$

$$v_*[-\alpha e^{-\alpha x}\cos(\tau - \beta x) + \beta e^{-\alpha x}\sin(\tau - \beta x)]$$

The factor, $e^{-\alpha x}$ is common to all terms, and we can group terms by their cosine or sine factor to give $$\tfrac{1}{2}(\alpha^2 - \beta^2 + 2\alpha v_*)\cos(\tau - \beta x) + (1 - \beta\alpha - \beta v_*)\sin(\tau - \beta x) = 0 \quad (30)$$

Any linear combination of sine and cosine can be rewritten as a sine wave with a different amplitude and phase, e.g.

$$C_1 \cos(y) + C_2 \sin(y) = C_3 \sin(y + w) \quad (31)$$

where $$C_3 = \sqrt{C_1^2 + C_2^2} \quad (32)$$

If $C_3$ is 0, then $C_1$ and $C_2$ must also both be zero giving us two equations $$\alpha^2 - \beta^2 + 2\alpha v_* = 0 \quad (33)$$

and $$1 - \beta(\alpha + v_*) = 0 \quad (34)$$

These equations can be used to derive a number of useful relationships in the analysis of temperature time series data. Either can be used alone to estimate v*, but there are other useful relationships that can be derived from equations (33) and (34). Different solution strategies are illustrated below, isolating relationships between 1) v* and $\alpha$, 2) v* and $\beta$, 3) v* and the ratio of $\alpha$ to $\beta$, and 4) $\beta$ and $\alpha$, each providing unique information about the system.

C. Relationships Between Velocity and Either 1) Amplitude Damping, or 2) Phase Shift Completing the square on equation (33)

$$\alpha^2 + 2\alpha v_* + v_*^2 - \beta^2 - v_*^2 = 0 \quad (35a)$$

$$(\alpha + v_*)^2 = \beta^2 + v_*^2 \quad (35b)$$

From equation (34), $$\beta = \frac{1}{(\alpha + v_*)} \quad (36)$$

which can be substituted into equation (35b)

$$(\alpha + v_*)^2 = \frac{1}{(\alpha + v_*)^2} + v_*^2 \quad (37)$$

Simplifying to show the full quadratic equation $$(\alpha + v_*)^4 - v_*^2(\alpha + v_*)^2 - 1 = 0 \quad (38)$$

Completing the square by adding and subtracting $v_*^4/4$ and simplifying $$[(\alpha+v_*)^2 - v_*^2/2]^2 = \frac{v_*^4}{4} + 1 \tag{39}$$

or $$(\alpha+v_*)^2 - \frac{v_*^2}{2} = \frac{1}{2}\sqrt{v_*^4+4} \tag{40}$$

yielding $$\alpha = \sqrt{\frac{\sqrt{v_*^4+4}+v_*^2}{2}} - v_*, \tag{41}$$

which relates amplitude damping between two sensors to the dimensionless velocity. When $v^*=0$, $\alpha=1$, equation (41) is the dimensionless analog to equation (9) above and (4b) of Hatch et al. [2006]. Continuing and substituting equation (41) into (36), by first moving the v* term in equation (41) back to the left side, $$\beta = \sqrt{\frac{2}{\sqrt{v_*^4+4}+v_*^2}} \tag{42}$$

Noting that $$\left(\sqrt{v_*^4+4}+v_*^2\right)\left(\sqrt{v_*^4+4}-v_*^2\right) = 4 \tag{43}$$

the following is obtained $$\beta = \sqrt{\frac{\sqrt{v_*^4+4}+v_*^2}{2}}, \tag{44}$$

which is analogous to equations (10) above and (5b) in Hatch et al. [2006]. Equation (44) also shows that β is constrained to the interval (0,1] and reaches its maximum at v*=0. The variable β asymptotically approaches 0 as v* goes to large positive or negative values.

D. Relationships Between Velocity and the Ratio of Amplitude Damping to Phase Shift Obtaining estimates of either α or β from equations (25) or (26) requires knowledge of sensor depth and the diffusivity of the medium, and there are times when depth and diffusivity may not be known with precision a-priori. In such a case, the ratio of the amplitude damping to the phase shift becomes useful because the rescaled depth is eliminated. A new parameter, η, is defined $$\eta = \frac{\alpha}{\beta} = \frac{-\ln(A_r)}{\Delta\phi}. \tag{45}$$

When v*=0, diffusive conditions, η, α, and β are all equal to 1. Based on earlier discussion, both α and β are positive and it follows that η is also positive. Substituting equation (45) into (33) yields $$\eta^2\beta^2 - \beta^2 + 2\eta\beta v_* = 0 \tag{46}$$

simplifying to $$\beta = \frac{2\eta v_*}{1-\eta^2} \tag{47}$$

Both η and β are positive, so the sign of v* is the same as 1−η, considering the factoring of the denominator. Substituting equation (45) into (34) yields $$\beta(\eta\beta+v_*)=1 \tag{48}$$

Eliminating β by substituting equation (47) yields an equation with only v* and η

$$\frac{2\eta v_*}{1-\eta^2}\left(\eta\frac{2\eta v_*}{1-\eta^2}+v_*\right) = 1 \tag{49}$$

simplifying $$2v_*^2\frac{\eta}{1-\eta^2}\left(\frac{2\eta^2}{1-\eta^2}+\frac{1-\eta^2}{1-\eta^2}\right) = 1 \tag{50}$$

yields a solution for $v^{*2}$ $$v_*^2 = \frac{(1-\eta^2)^2}{2\eta(1+\eta^2)} \tag{51}$$

The sign of v* is the same as $1-\eta^2$, which is the positive root. Summarizing earlier sign conventions (z positive downward) and discussion of signs, positive velocities are downwelling with η<1, and negative velocities are upwelling with η>1.

$$v_* = \frac{1-\eta^2}{\sqrt{2\eta(1+\eta^2)}} = \frac{1}{\sqrt{2}}\frac{\frac{1}{\eta}-\eta}{\sqrt{\frac{1}{\eta}+\eta}} \tag{52}$$

When considering the relative dominance of advective and diffusive heat transport, we can look in the limit, and note that v* or $P_e$ are large when
either $\sqrt{\eta} \gg 1$ or $$\frac{1}{\sqrt{\eta}} \gg 1,$$

showing that η is a direct indicator of the relative magnitude of conduction and advection.

While the first form in equation (52) may be practical in some situations, the second form on the far right side of equation (52) shows the symmetry of the solution around η=1 in a ratio sense. Equation (52) offers a solution that is more directly related to temperature time series, and does not require knowledge of the depth of instrument placement. Knowledge of diffusivity is still required to estimate the advective thermal velocity from v*, however, and we address this below. A useful feature of equation (52) in contrast to equations (9), (10), (41) and (44) is that it is an explicit closed-form solution, which is to say that it does not require iterations or numerical methods for root finding to solve for v* from field derived variables. There are other advantages to this solution that are not as readily apparent strictly from the mathematical form. For some analyses, it is useful to be able to easily invert equation (52) and solve for η given v*. In this case an explicit form is readily obtained by dividing equation (41) by (44)

$$\eta = \frac{\alpha}{\beta} = \frac{\sqrt{\frac{\sqrt{v_*^4+4}+v_*^2}{2}} - v_*}{\sqrt{\frac{\sqrt{v_*^4+4}-v_*^2}{2}}} = \frac{\sqrt{\sqrt{v_*^4+4}+v_*^2} - \sqrt{2}\,v_*}{\sqrt{\sqrt{v_*^4+4}-v_*^2}} \quad (53)$$

E. Completing the Solution: Estimating Diffusivity, Depth Variation, and $V_t$

The direct correspondence between η and v* is useful for obtaining information regarding the diffusive properties of the system because the effects of velocity can be separated from the effects of diffusion to a particular depth. Solving equation (34) for v* and substituting into equation (33) to eliminate v*, describes the relationship between the amplitude decay rate and the phase shift rate:

$$2\frac{\alpha}{\beta} = \alpha^2 + \beta^2 \quad (54)$$

Recalling equations (26) and (27), the definitions of α and β, and equation (45), the definition of η, $$2\eta = \left[\frac{\ln(A_r)}{\Delta x}\right]^2 + \left[\frac{\Delta\phi}{\Delta x}\right]^2 \quad (55)$$

Recalling further that Δx is the rescaled depth, containing both depth and diffusivity information (equation (15c)), and rearranging $$\left(\frac{\Delta z}{z_d}\right)^2 = \frac{(\ln^2(A_r) + \Delta\phi^2)}{2\eta} \quad (56)$$

which can be simplified to solve for Δz, if $z_d$ or $\kappa_e$ are known.

$$\Delta z = z_d \sqrt{\frac{\ln^2(A_r) + \Delta\phi^2}{2\eta}} \quad (57)$$

Equation (57) is particularly useful for tracking scour and aggravation over time once $z_d$, a relatively constant characteristic in time, has been estimated. Equation (56) can also be solved for $z_d$, and thereby $\kappa_e$, if Δz is known:

$$z_d = \Delta z \sqrt{\frac{2\eta}{\ln^2(A_r) + \Delta\phi^2}} \quad (58)$$

and $$\kappa_e = \frac{\eta\omega\Delta z^2}{\ln^2(A_r) + \Delta\phi^2} \quad (59)$$

Applying equations (14) and (20) with (52) and (58) yields an expression for estimating the advective thermal velocity directly from observations of depth and temperature $$v_t = \frac{\omega\Delta z}{\sqrt{\ln^2(A_r) + \Delta\phi^2}} \frac{1-\eta^2}{\sqrt{(1+\eta^2)}} \quad (60)$$

Taken together, equations (59) and (60) provide estimates of the two parameters for the original PDE (3). If diffusivity information for a particular set of measurements is deemed more reliable than the depth measurements for some reason, equation (57) could be substituted into equation (60) yielding $$v_t = \frac{\omega z_d}{\sqrt{2\eta}} \frac{1-\eta^2}{\sqrt{(1+\eta^2)}} \quad (61)$$

Equation (54) can also be rearranged to provide estimates of α and β individually as functions of η (meaning that no depth or diffusivity data are required), which can be useful for directly providing the parameters for equation (24); the two equations are $$\beta = \sqrt{\frac{2}{\frac{1}{\eta}+\eta}} \quad (62)$$

and $$\alpha = \beta\eta = \eta\sqrt{\frac{2}{\frac{1}{\eta}+\eta}} \quad (63)$$

Equations (62) and (63) may also be used to estimate the depth of a sensor, diffusivity, or thermal velocity in a fashion similar to that outlined following equations (55)-(60) by drawing on equations (26) and (27).

$$\Delta z = \Delta\phi z_d \sqrt{\frac{\frac{1}{\eta}+\eta}{2}} = \frac{-\ln(A_r)z_d}{\eta}\sqrt{\frac{\frac{1}{\eta}+\eta}{2}} \quad (64a)$$

$$z_d = \frac{\Delta z}{\Delta\phi}\sqrt{\frac{2}{\frac{1}{\eta}+\eta}} = \frac{\eta\Delta z}{-\ln(A_r)}\sqrt{\frac{2}{\frac{1}{\eta}+\eta}} \quad (64b)$$

$$\kappa_e = \frac{\omega\Delta z^2}{\Delta\phi^2\left(\frac{1}{\eta}+\eta\right)} = \frac{\omega\eta^2\Delta z^2}{\ln^2(A_r)\left(\frac{1}{\eta}+\eta\right)} \quad (64c)$$

$$v_t = \frac{\omega\Delta z}{\Delta\phi}\left(\frac{1-\eta^2}{1+\eta^2}\right) = \frac{\eta\omega\Delta z}{-\ln(A_r)}\left(\frac{1-\eta^2}{1+\eta^2}\right) \quad (64d)$$

Although equations (9) and (10) are known for yielding sometimes disparate answers for $v_t$ based on amplitude ratios or phase differences, equations (57)-(60) and (64a-d) can be expected to provide the same estimates of depth, diffusivity, or velocity. Equations (9)-(12) isolate phase information and amplitude information, and use an independent estimate of $\kappa_e$. If the estimate of $\kappa_e$ is incorrect, the equations will disagree. Equations (41) and (42) can have the same issue. Equations (57)-(60) and (64a-d) use the $\eta$ parameter; so contain both pieces of information in different algebraic arrangements and do not require an a-priori estimate of $\kappa_e$. Although rescaling the PDE (3) was useful for deriving the final set of equations, note that equations (57)-(60) and (64a-d) do not use non-dimensional variables and can be applied directly from analysis of temperature records.

F. Visualizing the Solutions

Figure 2:
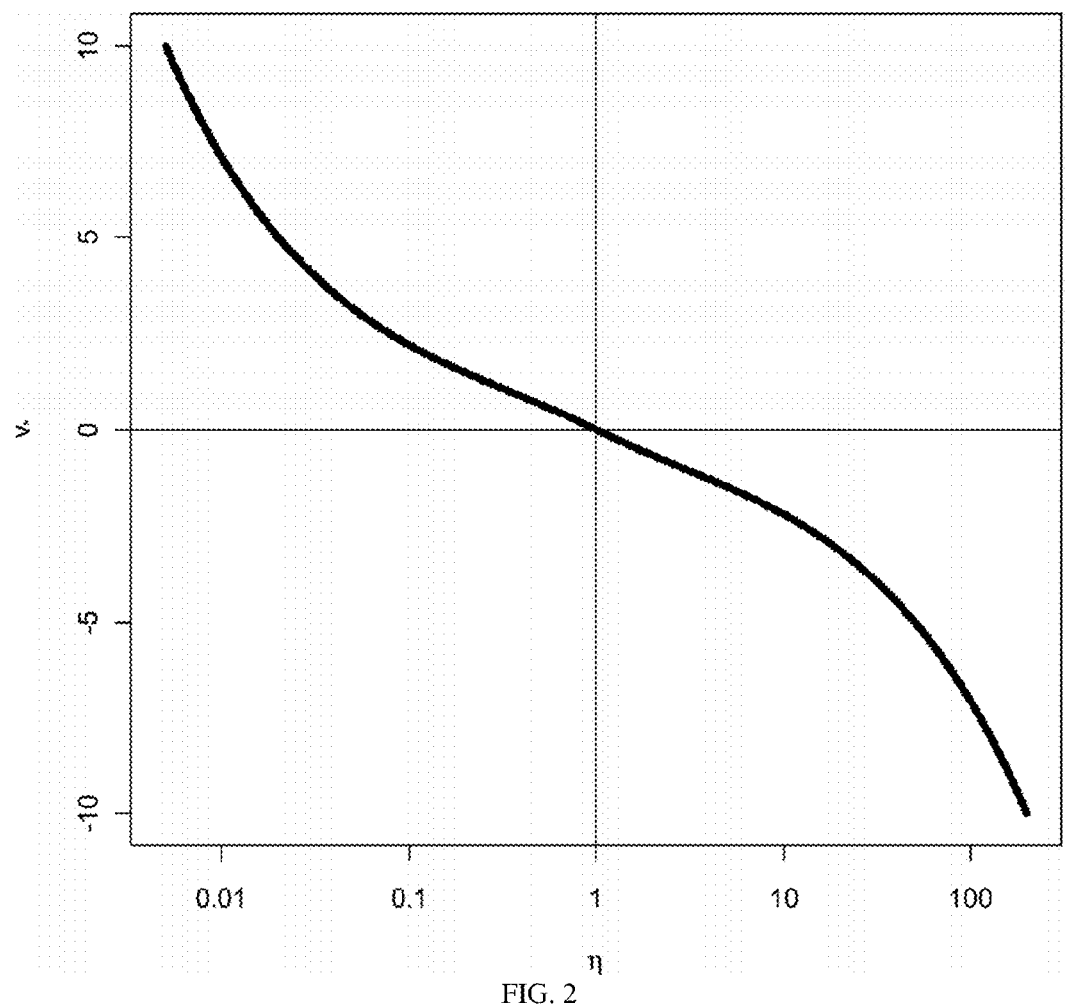
FIG. 2 illustrates the relationship between $\eta$ and $v^*$, where the $\eta$ axis is a log scale.

By non-dimensionalizing, a single "type curve" between $\eta$ is created, which is derived fairly directly from temperature measurements, and dimensionless velocity, v* (FIG. 2). The type curve can be resealed by the diffusive phase velocity, $v_d$, to estimate the advective thermal velocity, $v_t$. The relationship between $\eta$ and v* is similar in character for $\eta$ and $1/\eta$, so is best displayed with $\eta$ on a log-scaled axis. The relationship is symmetric around $\eta=1$, v*=0 (FIG. 2).

An altered form of upper left quadrant of this graph has been shown before. Stallman [1965] introduced the ratio a/b as part of a tabular/graphical solution technique for $v_t$ and $z_d$. The graph presented there has very similar underlying information, being essentially a plot of $\eta$ as a function of 2v*, however the log scale being on the 2v*-axis instead of the $\eta$-axis obscures some of its significance, particularly in giving the false appearance of an asymptotic relationship as $\eta$ approaches 1. That graph was derived from an analog to equation (53) and the graph was used to invert it to find v* from $\eta$. The explicit solution given here in equation (52) obviates the graphical step, but a basic procedure, relating both diffusive and velocity parameters to a and b, was outlined with the graphical solution.

Figure 3:
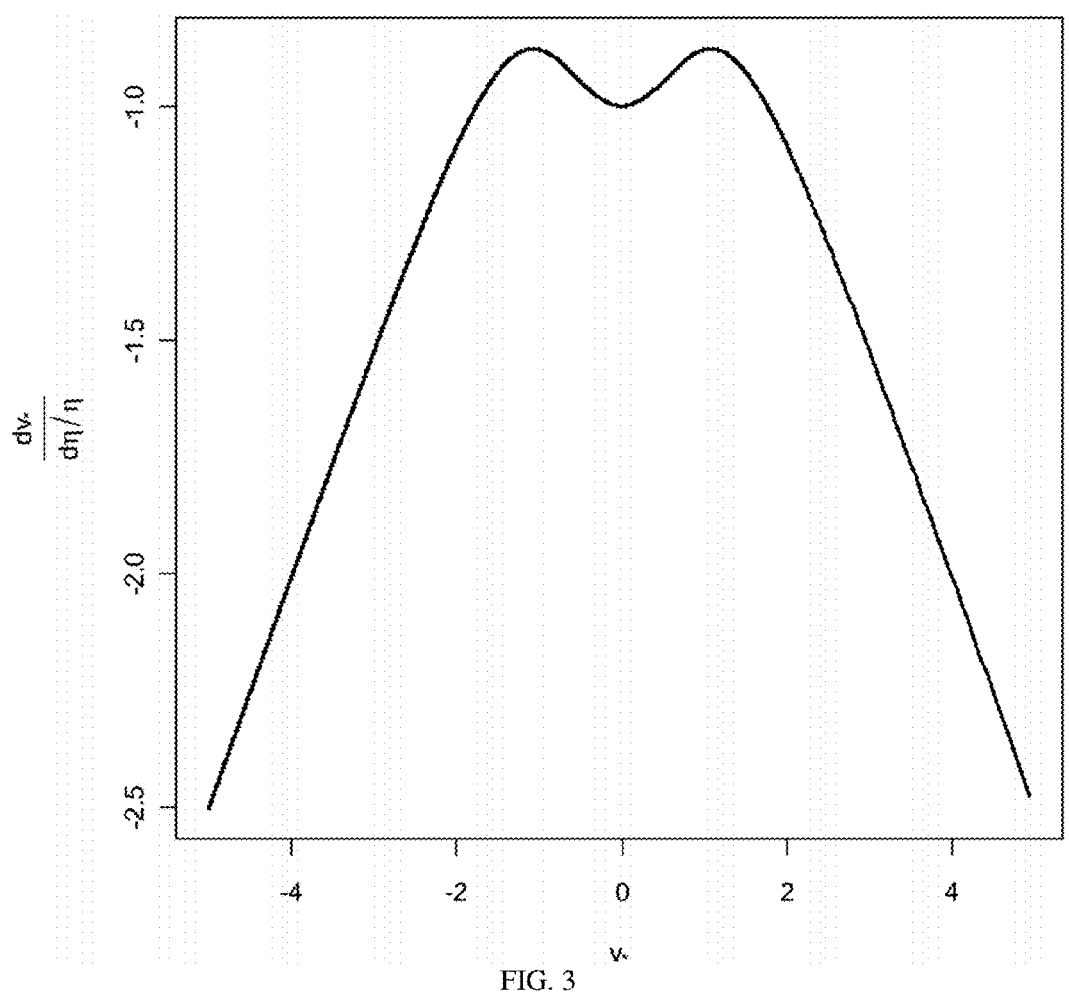
FIG. 3 illustrates the sensitivity of $v^*$ to ratio changes in $\eta$, where the curve is straight, it implies constant proportional sensitivity; where a 2% increase in $\eta$ yields a 1% increase in $v^*$. For smaller absolute values of $v^*$, a 1% change in $\eta$ yields a change in $v^*$ of between 0.009 and 0.01.

FIG. 3 shows the sensitivity of v* to ratio changes in $\eta$. The sensitivity of v* is lowest at low velocities, where a 1% increase in $\eta$ yields a change in v* between 0.009 and 0.01. At higher velocities, a ratio change in $\eta$ yields a ratio change in v*, so that a 2% increase in $\eta$ corresponds to a 1% increase in v*. This is a fairly practical sensitivity behavior for estimation so that velocities near zero can be found with reasonable precision while larger velocities are bounded in percent error. This unique form of sensitivity is applied, looking at the change in v* per unit change in $d\eta/\eta$ because of this semi-log behavior. For values of $\eta$ near 1, v* is nearly linear in $\log(\eta)$ (FIG. 2), suggesting this form, while at the extremes the relationship between v* and $\eta$ looks like $v_* \propto \sqrt{\eta}$ for large $\eta$, $v_* \propto 1/\sqrt{\eta}$ for $\eta$ approaching 0, again giving this form utility by highlighting the constant ratio sensitivity with the straight lines.

Figure 4:
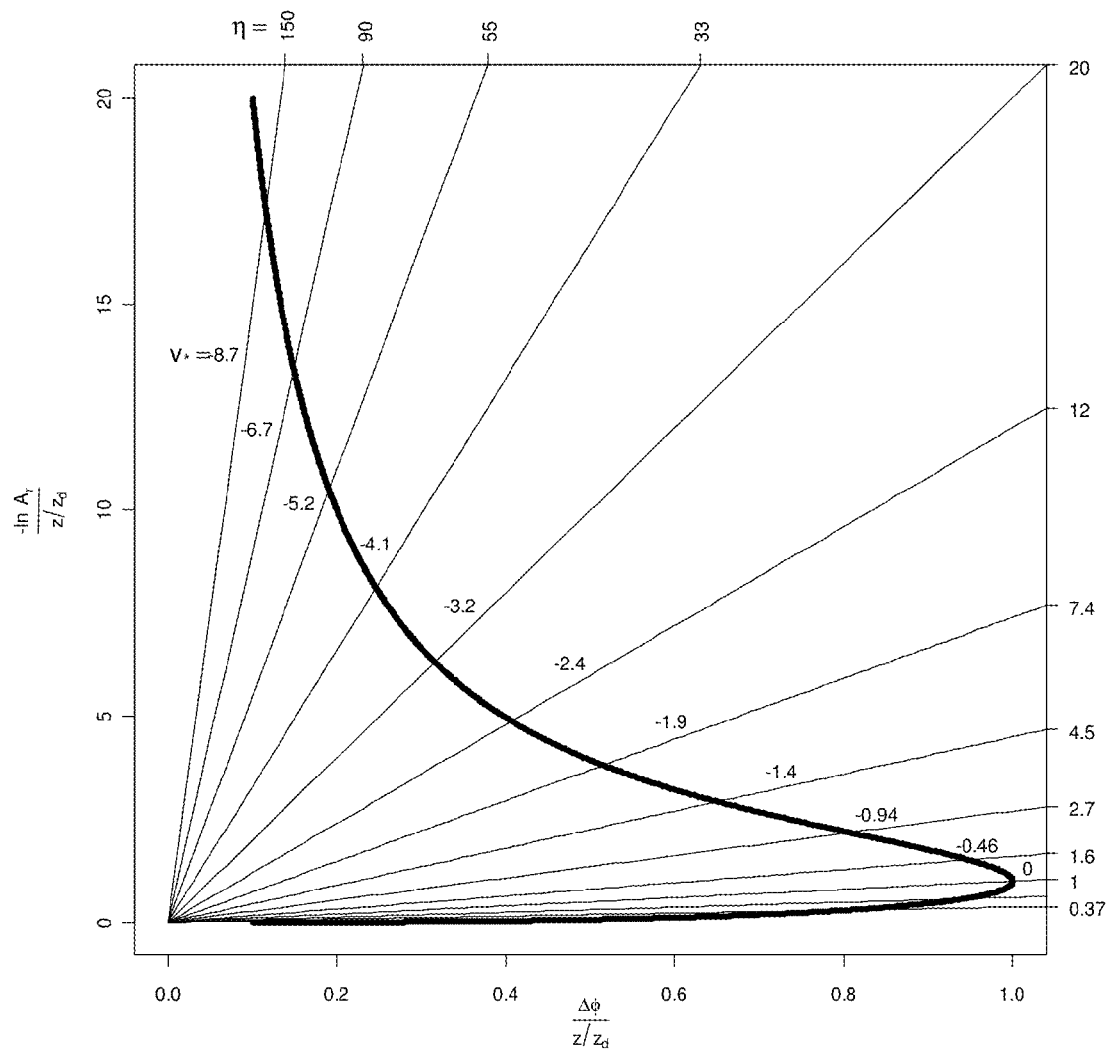
FIG. 4 illustrates the relationship between $\Delta\phi$ and $\ln(A_r)$ scaled by non-dimensional depth as $\eta$ or $v^*$ (on the labeled lines) vary. $\ln(A_r)$ and $\Delta\phi$ are not independent, but rather that, for a specific location (set diffusivity and depth), one is specifically related to the other by the fluid velocity. This image shows essentially the half space for $\eta>1$, while the portion of the relationship for $0>\eta>1$, is greatly compressed. If the y axis is plotted on log scale they appear approximately symmetrical, but the lines of constant $\eta$ become curved.

The equations describe a complete set of relationships between $\eta$, v*, amplitude ratio changes with depth, and phase changes with depth (FIG. 4). What is generally unappreciated in solutions where information about log amplitude ratio or change in phase is used independently is that the relationship between them is constrained. The relationship between v* and $\eta$ is a new equation that describes this relationship, enabling further extraction of information from measurements (e.g. we now have two equations in two unknowns). Lines of constant $\eta$ and v* intersect the $A_r$ vs. $\Delta\phi$ curve to specify uniquely where along that curve a set of observations lie, and that curve could be specified as a parametric curve in v* or $\eta$. This unique situation can be attributed to the diurnal variation boundary condition, which changes the characteristic length scale of the problem from the fixed physical depth of observation usually applied in advection diffusion analysis to a depth related to the phase velocity of the diurnal temperature wave and the characteristic time scale of 1 day, which links the phase and amplitude, and gives depth an independent influence in the context of the relationship between the amplitude ratio and phase. The relationship is shown for $\ln(A_r)$ against $\Delta\phi$, each per unit of dimensionless depth. Although the curve is not quite symmetric if the y-axis is plotted as $\log(\ln(A_r))$, the lines of constant $\eta$ and v* would not be lines but curves; so this plot is essentially looking at half of the picture. The asymmetry is just a consequence of the relationship between $\eta$, $\beta$, and $\alpha$, and $\beta$ is symmetric in $\eta$.

Figure 5:
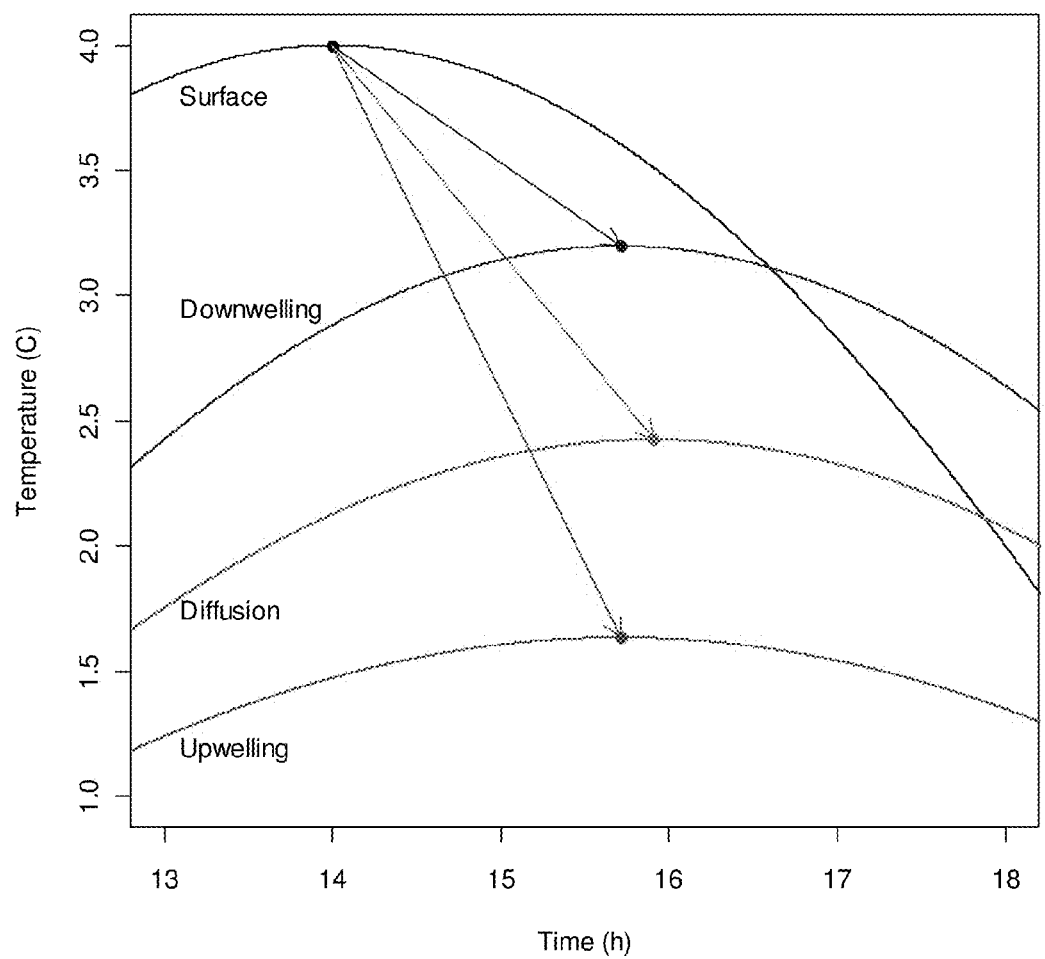
FIG. 5 is a plot of temperature versus time providing a hypothetical relative movement of the diurnal signal through the profile showing the relative shape of the temperature wave at depth under downwelling, neutral, and upwelling conditions at a depth that is ½ of the diurnal damping depth. The arrows show the relative movement of the crest of the diurnal signal, which peaks at 14:00 at the surface.
Figure 6:
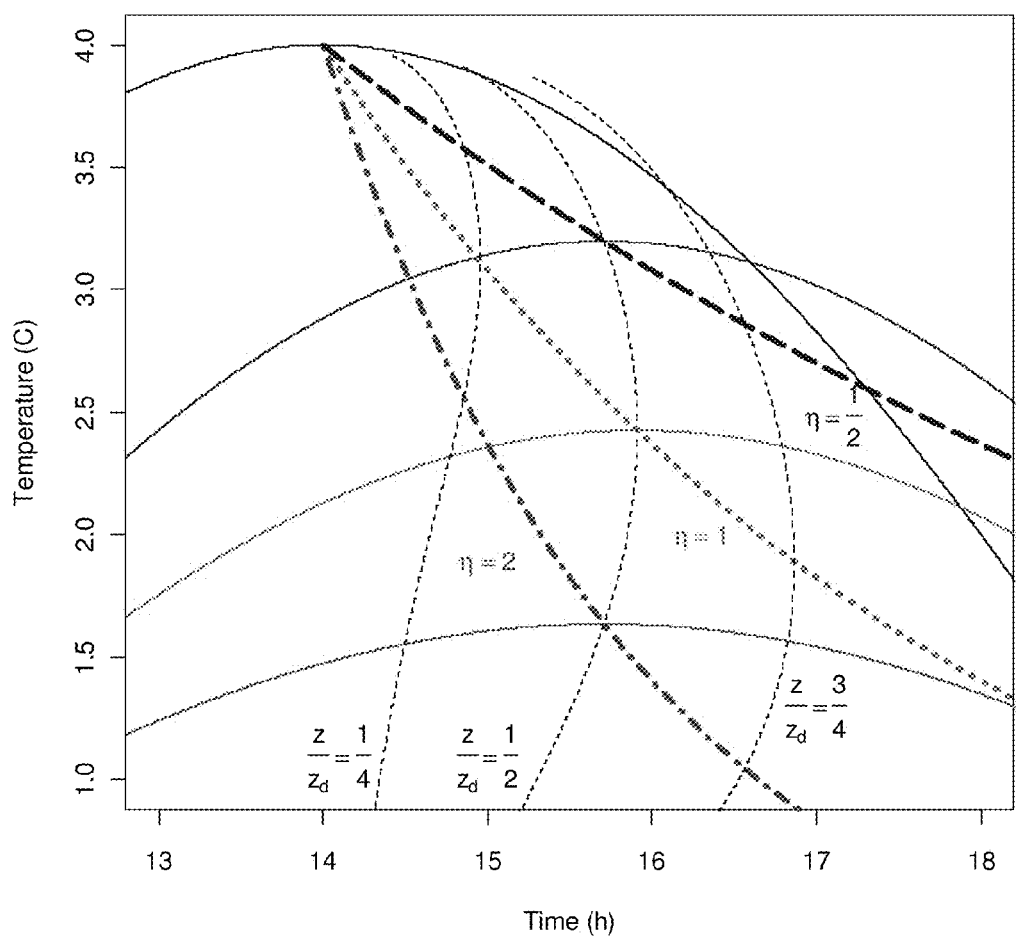
FIG. 6 is plot of temperature versus time having the same temperature traces as in FIG. 5 overlain with characteristic curves for motion of a point of constant phase (e.g. the crest of the diurnal signal) with curves for constant $\eta$, and for other curves constant z/zd. The $\eta$ characteristics show the path of the crest for a range of depths, whereas the black curves show the size and timing of the crest at a given depth for a range of velocities. The curves for $\eta$ have no other Parameters, and are also curves of constant $v^*$. The dashed curves are parameterized by the diffusive damping depth (where the amplitude at depth would be 1/e the amplitude at the surface under diffusive conditions), which depends on the diffusivity. The three temperature traces from FIG. 5 have a crest where their respective characteristics cross the curve for z=zd/2.

The coupling of $A_r$ and $\Delta\phi$ in ways that can be scaled with depth demonstrates that any two time series of temperature taken from two different depths can tell us whether the flow is downwelling, neutral, or upwelling. FIG. 5 shows a close up of the surface temperature variation and the potential subsurface temperature variations depending on flow conditions: downwelling, neutral, or upwelling. Upwelling flows further dampen amplitude of the diurnal cycle because the diffusive front is fighting the current. The upwelling condition serves to sharpen the temperature gradient, allowing diffusion to carry information to depth against the current. However this condition causes the amplitude information to diffuse rapidly, and amplitudes at even relatively shallow depths can be damped so strongly as not to be practically observable for large upwelling velocities. Downwelling flows carry information about the surface boundary condition to depth more rapidly than under diffusive conditions; so amplitudes are greater at depth and occur sooner than under purely diffusive circumstances. Phase differences and amplitude ratios can become indistinguishable for small depth changes or high velocities. A more detailed examination of the curves in FIG. 5 shows that curves of constant $\eta$ can be drawn emanating from the crest of the surface temperature wave, with initial temperature, $T_i$, and propagate as $$T - T_i = Ae^{-\eta \omega t} \quad (65)$$

to show the progressive position of the crest as one goes deeper (FIG. 6). These serve as characteristic curves along which $$\frac{dU}{d\tau} = -\eta e^{-\eta \tau} \quad (66)$$

Along these curves, then, equation (21) is a linear second order ordinary differential equation in depth with known parameter v*. Here they are plotted starting at the crest, but they could conceptually start anywhere along the surface temperature trace to plot the trajectory of that particular phase. Normally, method of characteristics solutions are applied to find possible analytical solutions along characteristics, e.g. for position along each curve with depth, but that analytical solution is already provided in terms of slight modifications to equations (57) and (64a), which offer the position along each curve as a function of dimensionless depth given $\ln(A_r)$ or $\Delta\phi$. Intersecting curves showing how the amplitude and phase of the crest vary over a range of velocities for a fixed dimensionless depth are also shown in FIG. 6. When depths are known they can be used to estimate the thermal diffusivity parameter.

Understanding the three different metrics is useful as well. From equation (24) $\beta$ is the wave number of the diurnal wave;

so β is the number of cycles (days) per unit of rescaled depth. If a constant phase is followed, $$\frac{d}{dt}(\omega t - \beta x) = 0 \quad (67)$$

and $$\frac{dx}{dt} = \frac{\omega}{\beta} \quad (68)$$

Recalling the rescaling of z to x, the phase velocity, $v_p$, of the diurnal wave under non-diffusive conditions is $$v_p = \frac{dz}{dt} = \frac{v_d}{\beta} \quad (69)$$

So that 1/β provides a scaling of the diffusive phase velocity for the non-diffusive case. The phase velocity is always positive, so always downwelling into the bed, even when fluid is upwelling. This may look more like a "thermal front velocity" into the bed than does the advective thermal velocity, particularly given that propagation of thermal variations from the stream into the bed occur even when $v_t$ is out of the bed. There are no conditions where $v_p$ would be expected to be equal to $v_t$, because both conductive and advective processes are taking place simultaneously.

For further insights, equations (69) and (34) can be used to write $$\alpha\beta = 1 - \frac{v_t}{v_p} \quad (70)$$

Equations (62) and (63) serve to replace the left hand side $$\frac{2\eta^2}{\eta^2 + 1} = \frac{v_p - v_t}{v_p} \quad (71)$$

Knowing the signs and relationships discussed earlier (meaning not dividing by 0), both sides can be inverted and the left side separated to provide $$1 + \frac{1}{\eta^2} = \frac{2v_p}{v_p - v_t} \quad (72)$$

Simplifying and inverting again, η is more directly related to the phase velocity and advective fluid velocity $$\eta = \sqrt{\frac{v_p - v_t}{v_p + v_t}} \quad (73)$$

providing further insights into the relationship between $v_p$ and $v_t$, such as $$|v_p| > |v_t| \quad (74)$$

Equation (74) seems fairly reasonable under downwelling conditions when the phase velocity and fluid velocity are in the same direction, but it seems more remarkable for upwelling conditions when they are in opposite directions. This relates to the sharpening of the temperature gradient discussed earlier. The phase velocity, though, is just the speed that information about variations in the upper boundary condition propagates into the bed. That needs to be paired with information about how rapidly the information (amplitude) is degrading.

Figure 7:
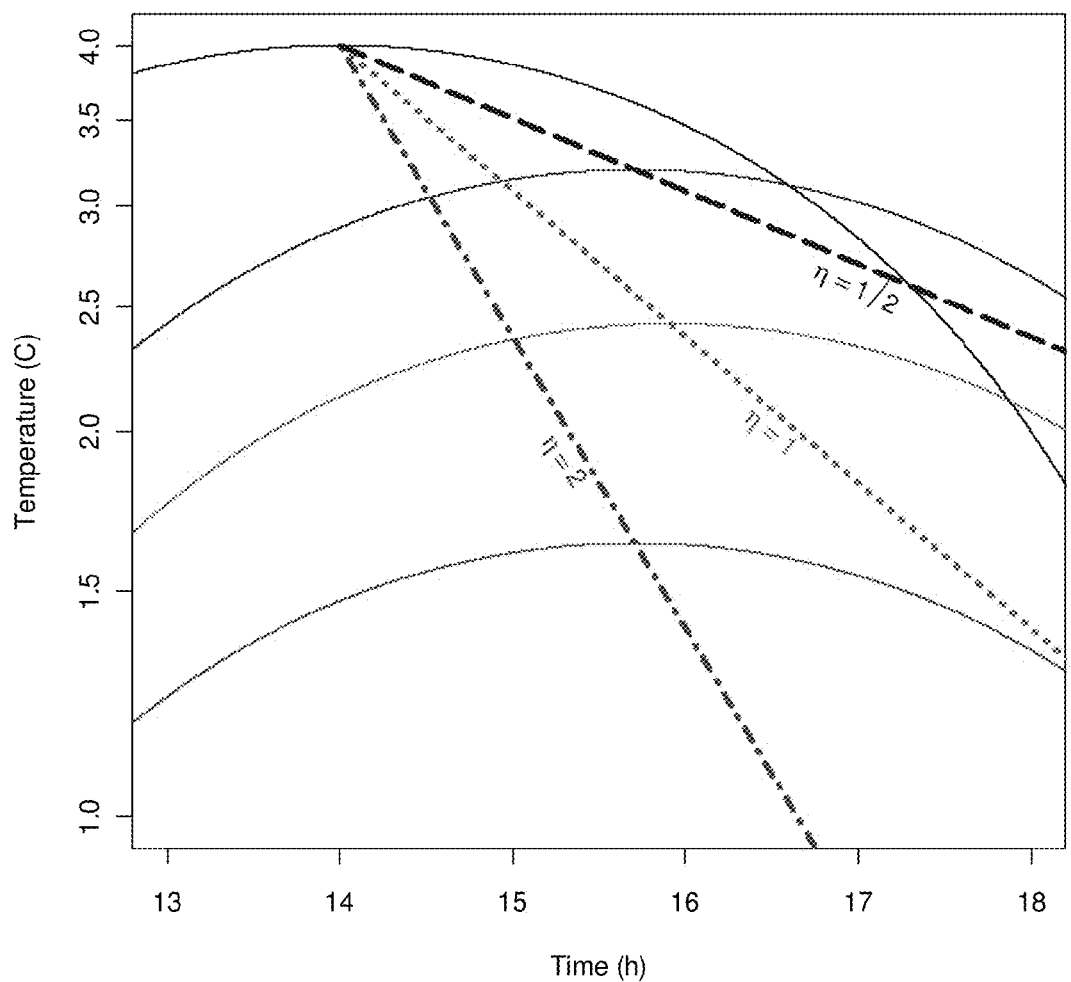
FIG. 7 provides the same temperature traces and $\eta$-characteristics as in FIG. 6 with the temperature anomaly axis on a log scale, rendering the $\eta$-characteristics as lines.

From equation (24), α is fairly readily recognized as the scaling of the depth for the non-diffusive case relative to the diffusive case, and represents the number of Napierian log cycles (e.g. a division of amplitude by e) per unit of resealed depth. The division of α by β then represents ratio changes in amplitude per unit depth divided by the number of cycles per unit depth. Because the frequency is fixed, the number of cycles is a measurement of time, and equations (1) and (45) describe η as the "velocity" of the log amplitude. If FIG. 6 is resealed to have a log axis for the temperature anomaly, curves of constant η become straight lines (FIG. 7). Although the units on the sides of FIG. 7 are hours and degrees, η represents the number of Napierian log cycles of amplitude per radian of a daily cycle. With a 24-hour period, a radian represents about 3.82 hours. An η of 1 is equivalent to a halving of amplitude approximately every 2.65 hours.

Figure 8:
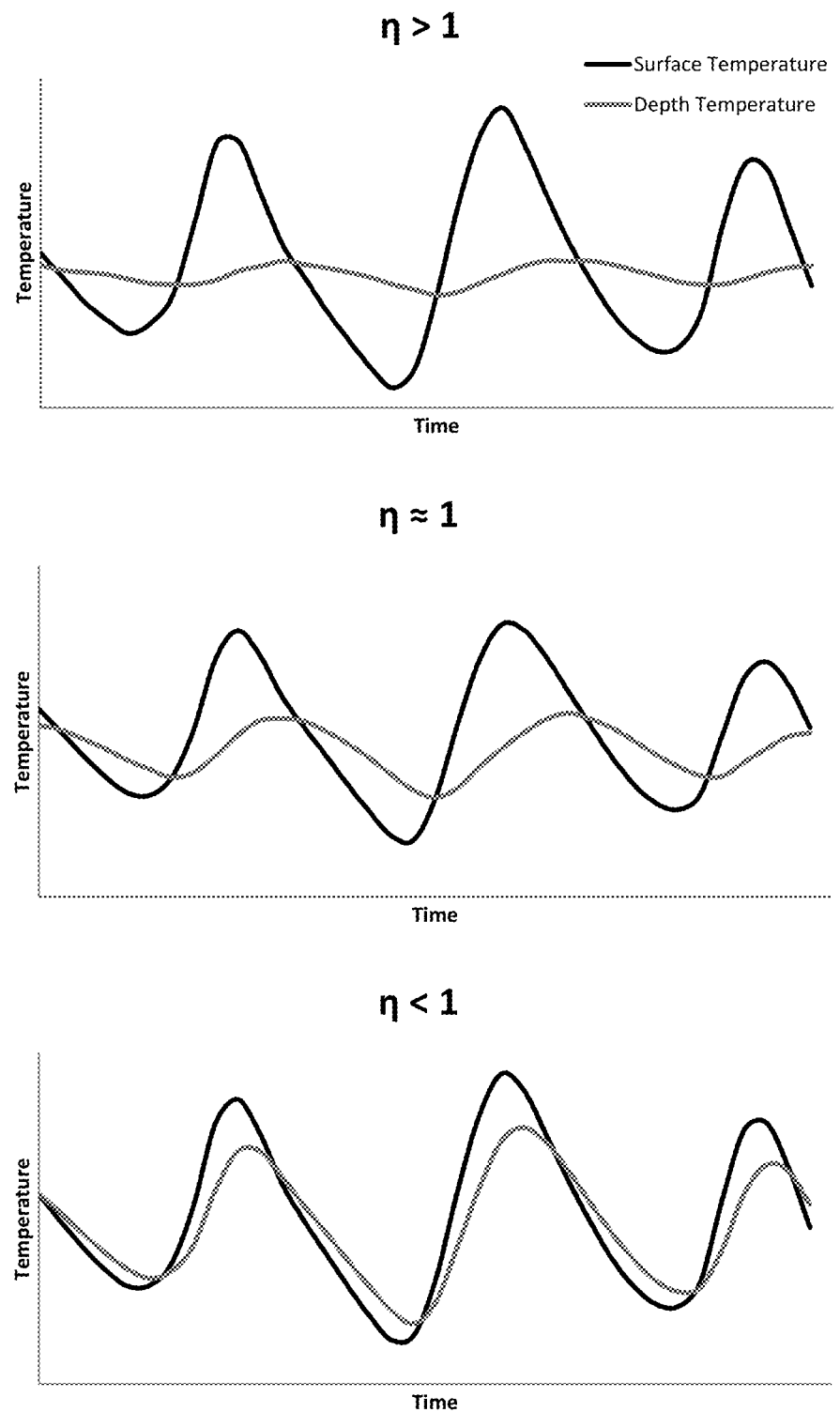
FIG. 8 provides examples of observed temperature traces at surface and at depth for upwelling ($\eta>1$, $v^*<0$), neutral ($\eta\approx1$, $v^*\approx0$), and downwelling ($\eta<1$, $v^*>0$) conditions.

Calculation of η does not require knowledge of any parameters of the system, nor the actual position of sensors; so the signatures of downwelling, neutral, and upwelling flows are fairly readily seen in temperature traces from two depths (FIG. 8). In FIG. 8, having a reference figure for η=1 makes the contrasts fairly easy. Alternatively, one or several characteristic curves placed on the graph with η=1 could facilitate comparisons given pair of time series.

G. Sensitivity to Errors in A-Priori Estimates of Diffusivity

Figure 9:
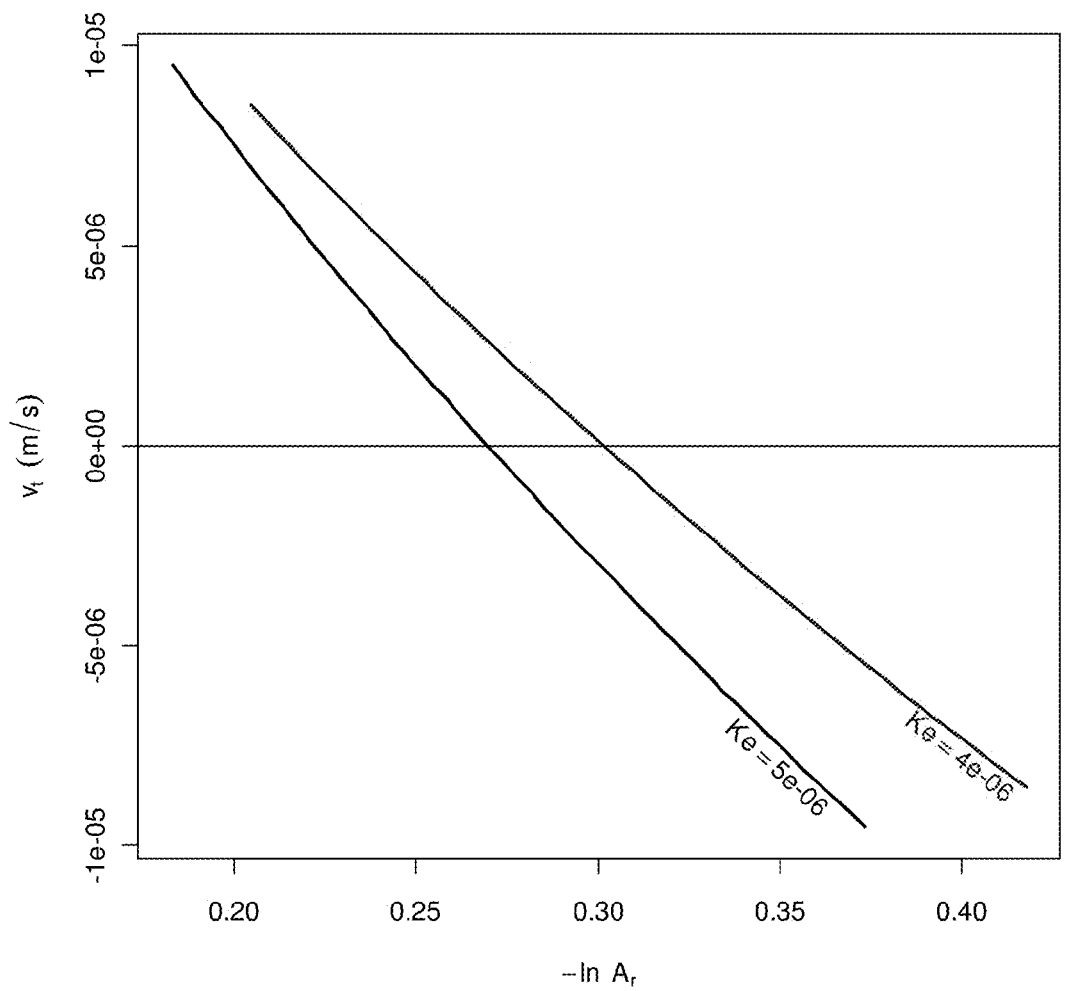
FIG. 9 illustrates differences in the relationship between the advective thermal velocity and the amplitude ratio for a change in diffusivity.

Although the equations presented here show how both thermal diffusivity and Darcian velocity can be found from temperature traces at known depths, previous solution methods required an a-priori estimate of diffusivity to solve for velocity [see e.g. discussion in Hatch et al., 2006]. A contrasting sensitivity of the different solution approaches to a-priori thermal diffusivity estimates is presented here, because it provides insights about the potential for the η-based solution to provide robust estimates of velocities near 0. Using only the log-amplitude ratio to estimate velocity based on an a-priori estimate of thermal diffusivity can result in predicting non-zero velocity, when in fact there is no velocity (FIG. 9), and as a corollary, it is likely to produce large percentage errors in velocity for small velocities. In FIG. 9, two curves are drawn, one for a 'true' diffusivity of $5 \times 10^{-6}$ m$^2$/s and one 20% smaller. For this shift, there is a shift of about 0.03 in units of ln($A_r$), or about 11%, for $v_t$=0. In the neighborhood of the intercept of the 'true' curve with 0 velocity, percentage errors are substantial, and over the range between the two estimates where ln($A_r$) intercepts 0 velocity, percentage error in velocity is essentially undefined. This would suggest that unless $\kappa_e$ is known with precision, identifying the sign of flow direction or the magnitude of small velocities could be in error when using equation (9).

Figure 10:
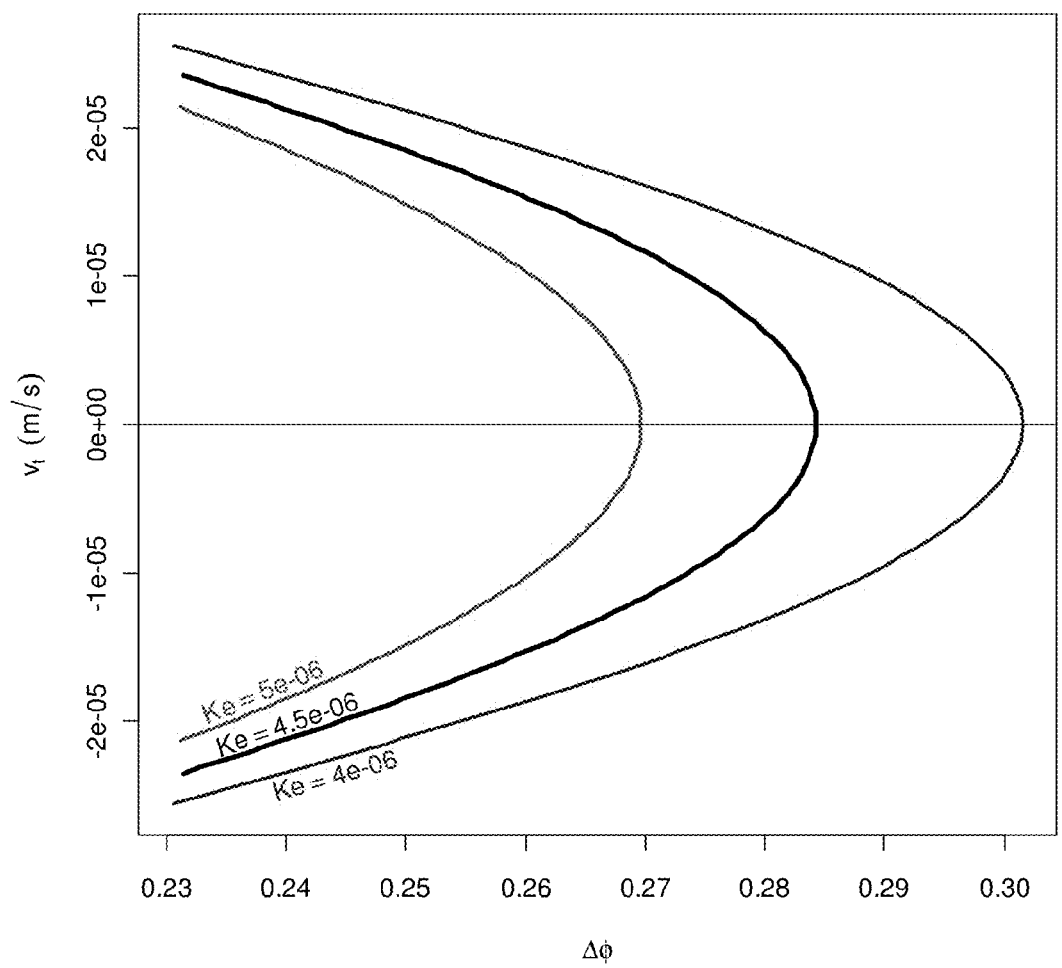
FIG. 10 illustrates differences in the relationship between the advective thermal velocity and the phase difference for a change in diffusivity. The vt axis ranges between ±1e-05 in FIGS. 9 and 11 when comparing.

The effects of errors in thermal diffusivity on estimates of velocity from phase differences are more complex. Phase differences are not currently used to estimate velocities near zero because the curve relating Δϕ and $v_t$ is steep near $v_t$=0. Nonetheless, there is utility in understanding the sensitivity. Shifting the 'true' value to $4.5 \times 10^{-6}$ m$^2$/s allows contrast of both under and over estimates as well as a look at the magnitude of a similar shift as was used for FIG. 9. If thermal diffusivity were overestimated, there would be a small range of Δϕ for which equation (10) would not be able to estimate a velocity, after which velocity would generally be underestimated (FIG. 10). If velocity is taken as 0, in the range where the $\Delta\phi$ value is not admissible, then substantial underestimates would occur over that range. If thermal diffusivity is overestimated, there is no value of $\Delta\phi$ for which zero velocity would be estimated, and velocities would be overestimated. As is already well appreciated, phase change is a poor way to find zero velocity or estimate small velocities [e.g. Lautz, 2010]. However for large velocities, errors appear to asymptotically decrease. The span of $\Delta\phi$ between the red and blue lines represents about 7 minutes, and the relative sensitivity of the phase equations to the amplitude equations for small changes in the independent variable can be seen by contrasting FIGS. 9 and 10.

Figure 11:
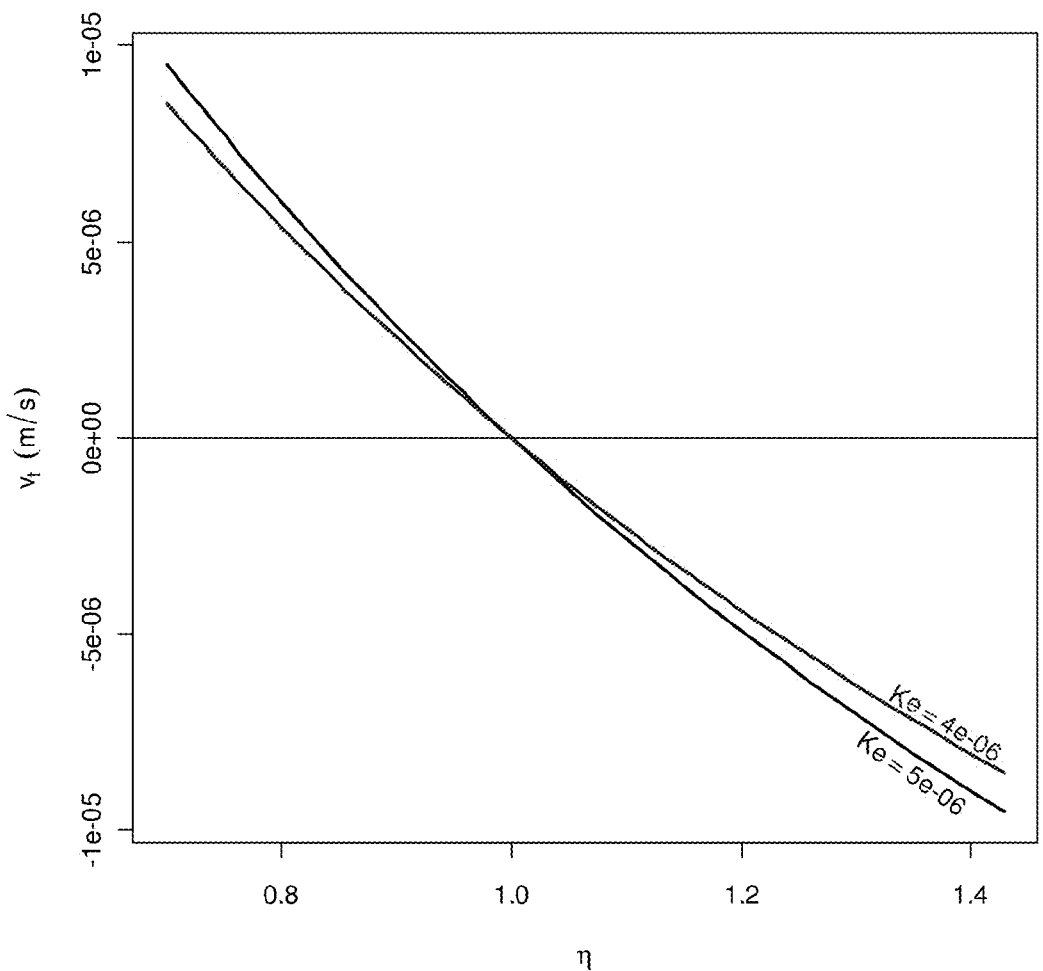
FIG. 11 illustrates differences in the relationship between the advective thermal velocity and $\eta$ for a change in diffusivity.

In contrast to the other approaches if an a priori estimate of $\kappa_e$ is applied, the $\eta$-estimated velocity near zero shows little error (FIG. 11). Zero velocity is found at $\eta=1$ regardless of the value of $\kappa_e$. Errors in velocity as one departs from zero velocity are only square-root dependent on the error in $\kappa_e$, and it is worthwhile to note the relative magnitude of errors in FIGS. 9 and 11 despite a similar velocity range and slightly larger relative range in $\eta$ in FIG. 11 than in $\ln(A_r)$ in FIG. 9. This means that if $\Delta z$ is not known, and $\kappa_e$ cannot be identified from measurements, the measured $\eta$ can still be used to reliably determine the direction of flow and an independent estimate of $\kappa_e$ will yield less error in $v_t$ than would be expected from other approaches for small flows. The utility of the approach might be most fully appreciated in circumstances where seasonal dynamics of flows are being examined, and flows may change from upwelling to downwelling as the groundwater aquifer changes configuration, for example. Although an example is provided here for one discrete change in thermal diffusivity, the theoretical foundation provided in the next section allows for a continuous representation of the effects of uncertainty in thermal diffusivity.

H. Sensitivity to Measurement Errors

Previous solutions of the vertical hyporheic fluxes, $q=v_t\gamma$, derived from segregated analysis of the phase and amplitude of the temperature signal have an implicit function form, and recursive or iterative numerical methods are required to find a solution. Consequently, the analysis of the propagation of the uncertainties associated with measurement errors and parameter estimations on hyporheic fluxes (magnitude and direction) relies on sensitivity analysis or methods such as Monte Carlo simulations [Gordon et al., 2012; Saltelli et al., 2004; Shanafield et al., 2011]. Conversely, the uncertainty of a quantity, f, which is an explicit function of n parameters, $x_i$, with i=1, 2 . . . n, due to their uncertainties expressed as variance, $\sigma_i^2$, and covariance $\sigma_{ij}$, can be quantified with the following equation [Arras, 1998; *ISO/IEC Guide* 98-3, 2008; Ku, 1966]:

$$\sigma_f = \sqrt{\sum_{i=1}^{n}\left(\frac{\partial f}{\partial x_i}\right)^2\sigma_i^2 + \sum_{i\neq j}\sum\left(\frac{\partial f}{\partial x_i}\right)\left(\frac{\partial f}{\partial x_j}\right)\sigma_{ji}} \quad (75)$$

where $\sigma_f$ is the standard deviation for the function $f$. This expression simplifies to the following equation when the parameters $x_i$ are independent from one another:

$$\sigma_f = \sqrt{\sum_{i=1}^{n}\left(\frac{\partial f}{\partial x_i}\right)^2\sigma_i^2} \quad (76)$$

A common limitation of this approach is that it assumes that uncertainties are normally distributed [Saltelli et al., 2004]. However, errors for both time and temperature measurements in the temperature sensors are typically reported with normal distributions. If a specified confidence interval different from that associated with a standard deviation needs to be used for the uncertainty analysis, equations (75) and (76) can be modified by replacing the standard deviation, $\sigma_i$, with the uncertainty values $u_A$ and $u_\phi$ with the prescribed confidence interval.

Equations (45), (52), (60) and (64d) are explicit solutions of $v_t$, $\eta$ and $v^*$ such that the propagation of the measurement errors of the phase ($\phi$) and temperature amplitude (A) and of the uncertainty of the thermal properties of the sediment ($\kappa_e$) can be quantified with equations (75) or (76). Because sediment thermal properties, temperature amplitude and phase measurements are independent variables, equation (76) can be adopted in this application. However, if the assumption of independence does not hold with different equipment or conditions the same analysis can be performed with equation (75).

The values of $\eta$ and $v^*$ only depend on measured temperature amplitudes and phase shifts and not on the sediment thermal properties. Thus, estimates of the uncertainty of $\eta$, $\sigma_\eta$, can be quantified with the following equation, which applies equation (75) for sensors at depth 1 (shallow) and 2 (deep) each with the same errors for the amplitude error $\sigma_A$ and phase error, $\sigma_\phi$:

$$\sigma_\eta = \sqrt{\frac{\sigma_A^2}{(\phi_2-\phi_1)^2}\left(\frac{1}{A_2^2}+\frac{1}{A_1^2}\right)+2\frac{\sigma_\phi^2 \ln\left(\frac{A_2}{A_1}\right)^2}{(\phi_2-\phi_1)^4}} \quad (77)$$

Figure 12:
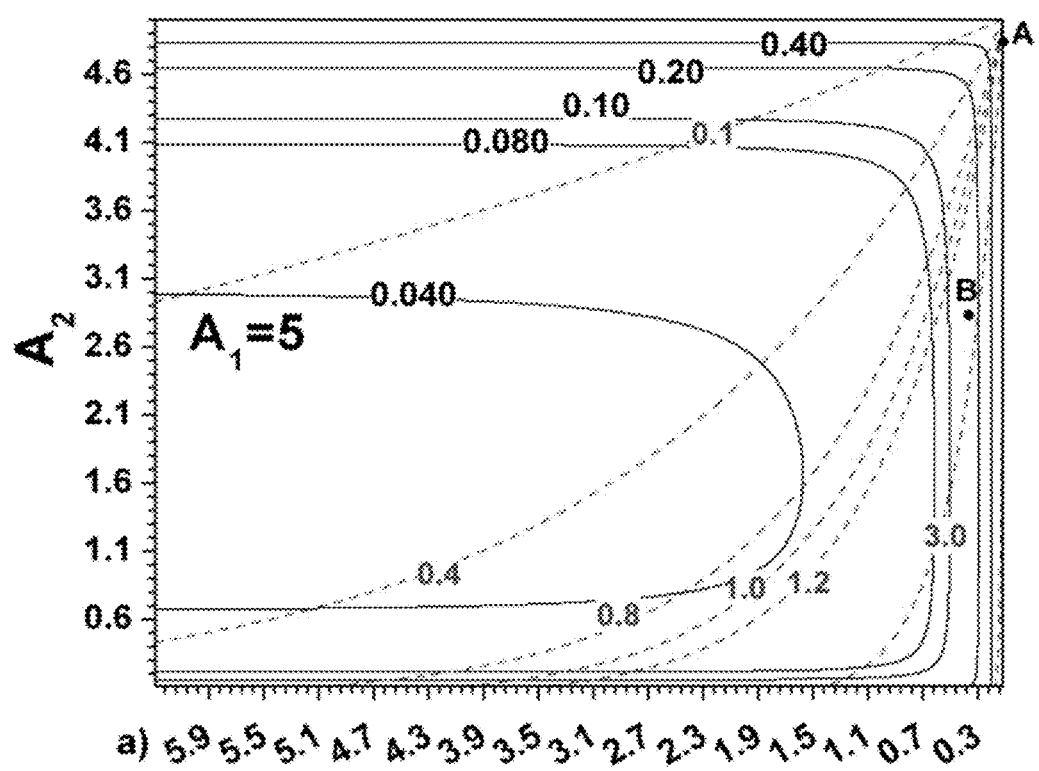
FIGS. 12-15—solid black lines represent a) root mean square error of $\eta$, $\sigma_\eta$, b) root mean square error of the dimensionless hyporheic flux, $\sigma_{v^*}$, c) the ratio between $\sigma_{v^*}$ and $v^*$ and d) $\Delta z/z_d$ as a function phase shift and amplitude of the deeper sensor with the amplitude of the shallower sensor fixed at 5° C. Dashed lines represent $\eta$ values, the points A and B represent values at two locations between sensors at the surface and at 10 cm deep. $A_1$ is the amplitude of the temperature signal (° C.) at the shallow sensor and $A_2$ is the amplitude of the temperature signal (° C.) at the deep sensor FIGS. 16-19—solid-black lines represent a) root mean square error of $\eta$, $\sigma_\eta$, b) root mean square error of the dimensionless hyporheic flux, $\sigma_{v^*}$, c) the ratio between $\sigma_{v^*}$ and $v^*$ and d) $\Delta z/z_d$ as a function phase shift and amplitude of the deeper sensor with the amplitude of the shallower sensor fixed at 2° C. Dashed lines represent $\eta$ values, the points A and B represent values at two locations between sensors at the surface and at 10 cm deep. $A_1$ is the amplitude of the temperature signal (° C.) at the shallow sensor and $A_2$ is the amplitude of the temperature signal (° C.) at the deep sensor.
Figure 16:
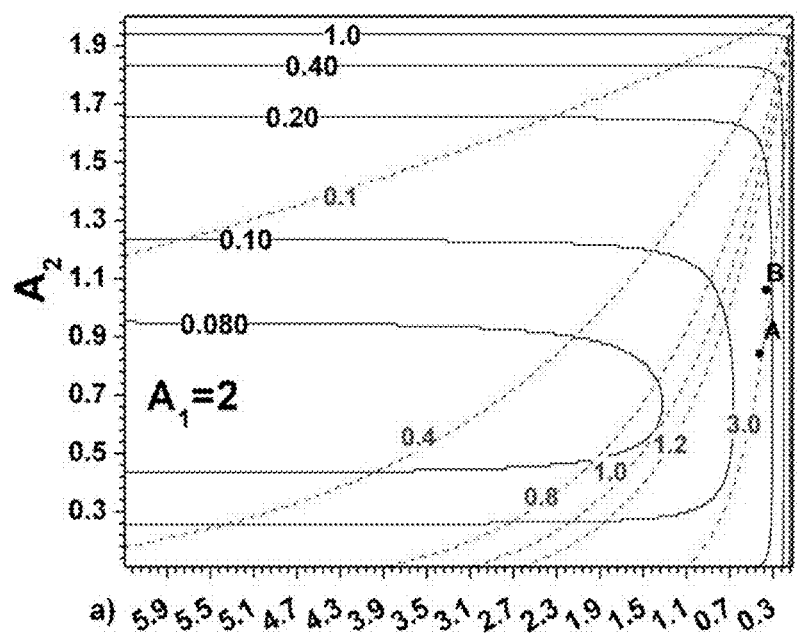

If $\sigma_A$ and $\sigma_\phi$ are known, then contour plots of the distribution of o over the amplitude and phase field can be developed (FIGS. 12 and 16). FIGS. 12 and 16 show an example of contour plots for $\sigma_A=0.1°$ C. and $\sigma_\phi=0.06$ rad (about 13.75 minutes). Large errors cluster near small phase shift values and small amplitude differences between sensors. Errors are large and $\eta$ curves converge in the upper right-hand corner of FIGS. 12 and 16, where differences of both amplitude and phase shift are small. Thus, predictions of the hyporheic flux direction, which only depends on $\eta$ values, are less certain in that section of the graph than other areas of the amplitude-phase field. Measurements from the field experiments of Gariglio [2012] for location A provide highly uncertain estimations of hyporheic flux directions (FIG. 12) during summer with a high flux rate. However, measurements at position B are reliable. Reliability is high at both locations in spring even when surface amplitude is small, because upwelling flux rates were not as challenging for estimating fluxes during springtime (FIG. 16).

Specifying equation (76) for the standard deviation of the dimensionless advective thermal velocity, $\sigma_{v^*}$, quantifies the uncertainty on the intensity of the hyporheic fluxes:

$$\sigma_{v_*} = \frac{1}{\sqrt{2}}\sqrt{\left[\frac{-\sqrt{\eta+\frac{1}{\eta}}\,(\eta^4+6\eta^2+1)}{2\eta(\eta^2+1)^2(\phi_2-\phi_1)}\left(\frac{1}{A_2}-\frac{1}{A_1}\right)\right]^2\sigma_A^2 + \left[\frac{-\sqrt{\eta+\frac{1}{\eta}}\,(\eta^4+6\eta^2+1)}{(\eta^2+1)^2(\phi_2-\phi_1)}\right]^2\sigma_\phi^2} \quad (78)$$

Figure 13:
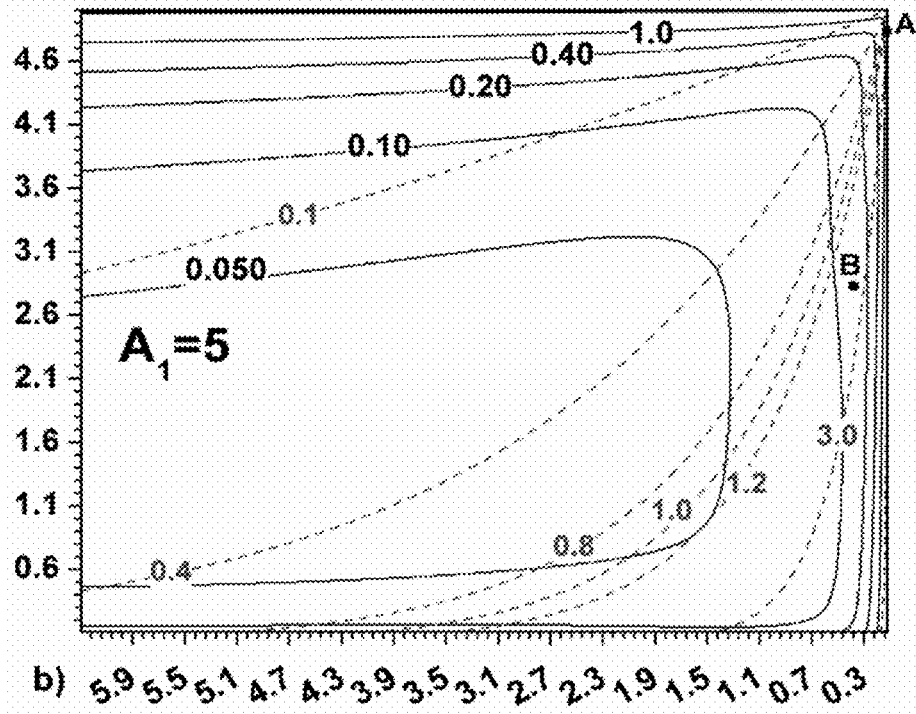
Figure 14:
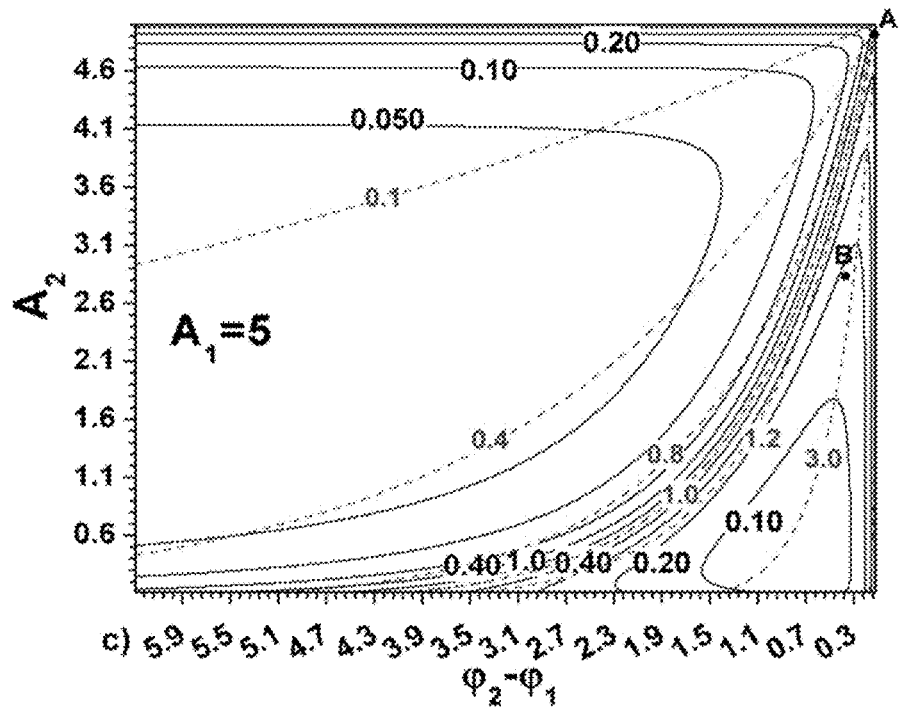
Figure 15:
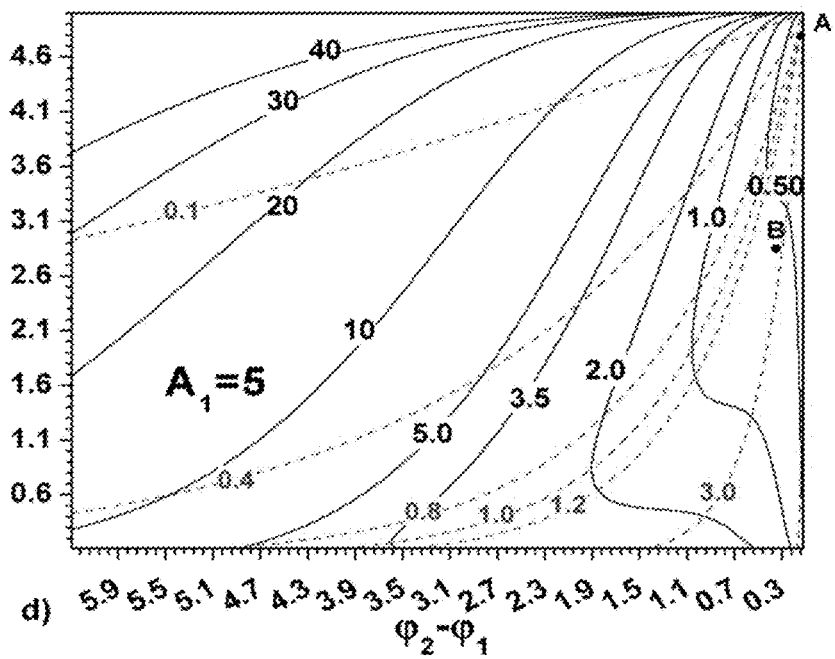
Figure 17:
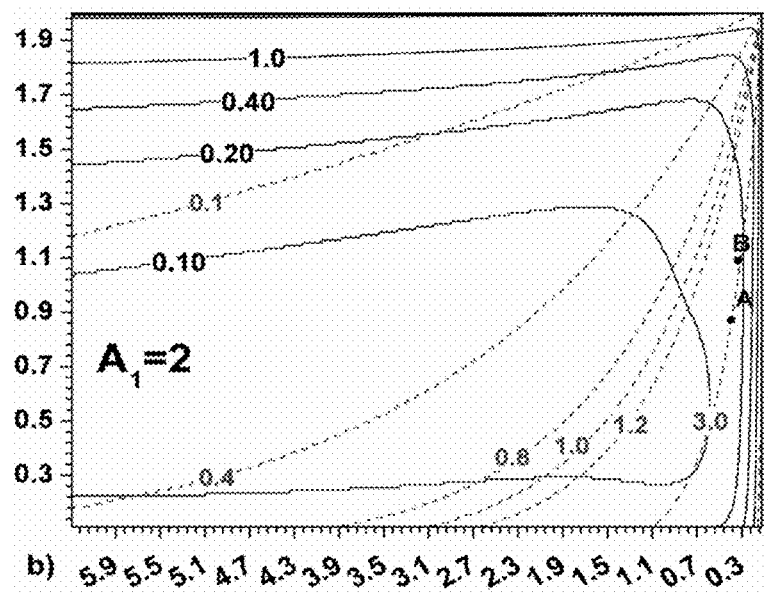
Figure 18:
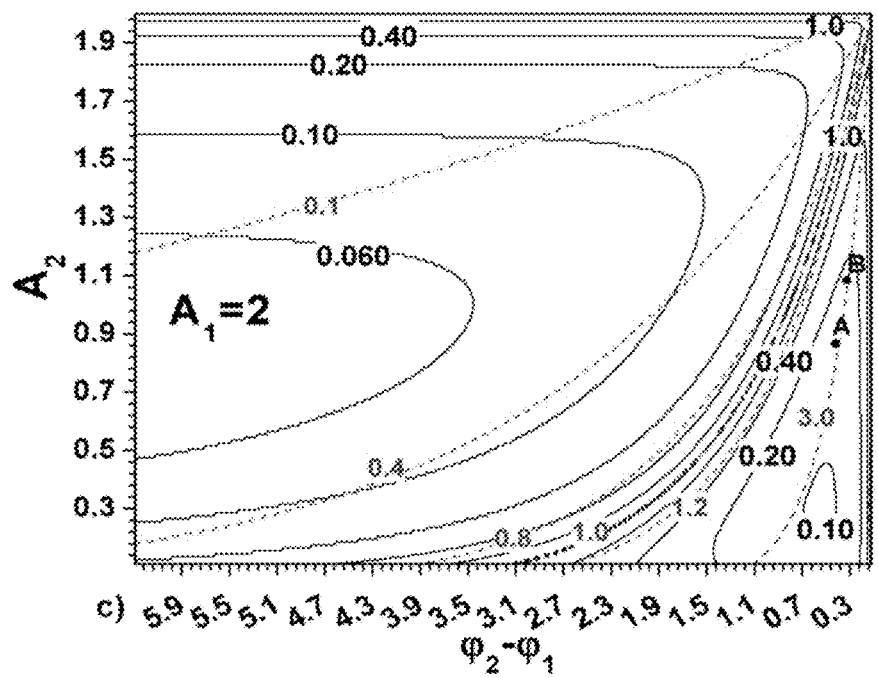
Figure 19:
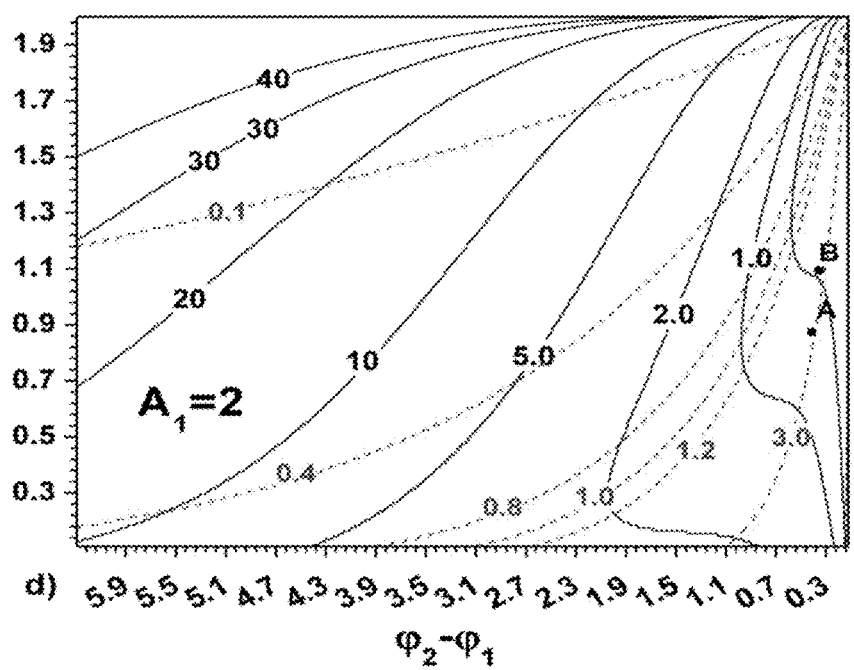

Uncertainty values ($\sigma_{v^*}$) are small in the central region of the graph and increase toward high amplitudes and small phase shifts (FIGS. 13 and 17) as observed in the previous figures (FIGS. 12 and 16). Absolute uncertainties are large in upwelling areas ($\eta>1$), but large values of $v^*$ offset this increase in absolute error. This is illustrated by the contour plot of the coefficient of variation of $v^*$, defined as $\sigma_{v^*}/v^*$, (FIGS. 14 and 18). These figures show a ridge with errors larger than 100% along the $\eta=1$ curve. This is because hyporheic fluxes tend to zero but errors are still finite near $\eta=1$. However, this region of the graph around the $\eta=1$ curve is less important for estimating advective hyporheic velocities, because diffusion dominates, and hyporheic fluxes are negligible. Interestingly, downwelling fluxes have a large area with errors below 5% (FIG. 14). This area decreases for small temperature amplitudes of the shallow sensors (cf., FIGS. 14 and 18). Consequently, the reliability of this method may depend on local surface water temperature conditions. However, setting the spacing between sensors can partially offset the effects of local surface water temperature conditions and maximize the performance of this technique by minimizing the propagation of uncertainty. For instance, in areas where downwelling fluxes dominate, it would be appropriate to use spacing of $\Delta x=10$ (recall that $\Delta x=\Delta z/z_d$) because this line would intersect low-error contour curves. However, this sensor arrangement would not be able to detect any change in flux direction. On the other hand, sensors with $\Delta x=1$ would be able to differentiate upwelling and downwelling fluxes and still intersect contour lines with relatively low errors. Conversely, sensors which are too close, $\Delta x<0.5$, would provide less reliable estimates. Thus, inspection of the thermal properties and thermal fluctuations of the system where the sensors are deployed may provide valuable information on designing the experimental setup. Sensors at positions A and B are approximately on the $\Delta x=0.5$ line, which constrains the response of the sensors to move along that line (cf., FIGS. 15 and 19).

Figure 20:
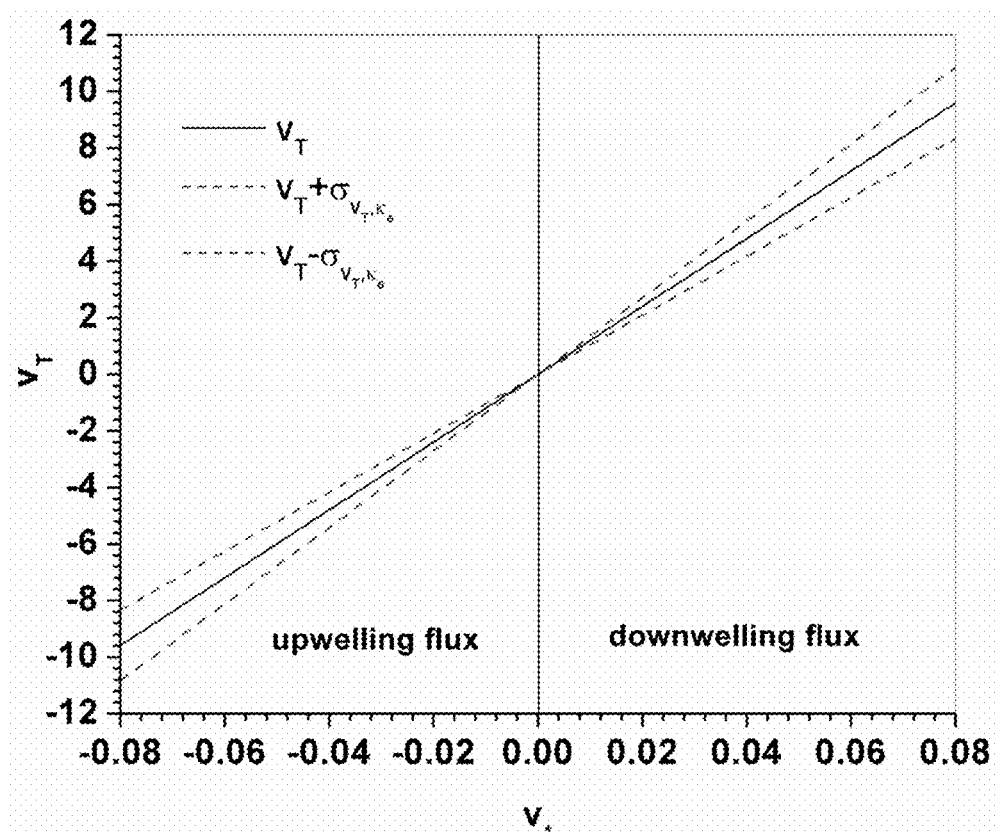
FIG. 20 illustrates propagation of the uncertainty of the effective thermal diffusivity on the advective thermal velocity uncertainty.

These methods can be applied to expand on the sensitivity to thermal diffusivity error in the previous section to provide a more continuous representation of the effects. Uncertainty on the thermal diffusivity of the sediment affects the dimensional value of advective thermal velocity, $v_t$ ($v_t = v^*(2\omega\kappa_e)^{1/2}$). This uncertainty can be quantified with the following equation:

$$\sigma_{v_t, k_e} = v_* \sqrt{\frac{\omega}{2\kappa_e}} \sigma_{k_e} \tag{79}$$

which shows that the error due to the uncertainty of the thermal properties is a percentage of $v^*$. The error depends on the inverse of the square root of the thermal diffusivity and on the square root of the angular frequency of the signal, which is fixed and equal to one day. The typical range of $\kappa_e$ in saturated soils is between $4.42\times10^{-7}$ and $9.2\times10^{-7}$ m$^2$/s with mean values $6.6\times10^{-7}$ m$^2$/s. If the uncertainty around the mean values is assumed to be $\sigma_{ke}=2.44\times10^{-7}$ m$^2$/s the error on $v_t$ is 13.03% of $v^*$ and its effect on $v_t$ can be plotted as a function of $v^*$ (FIG. 20).

I. Tracking Bed Scour over Time

Because the distance between sensors offers an independent piece of information from $\eta$, measurements of diurnal temperature variations also provide the opportunity to measure changes in the streambed above a sensor. With one sensor in the water column, measuring the surface boundary condition and a second sensor buried at depth, variations in depth to the sensor can be tracked using equations (57) or (64a). Over the period that scour is tracked, $\kappa_e$ must be assumed unchanging and depth invariant. It can be estimated from a time period when $\Delta z$ is known.

Figure 21:
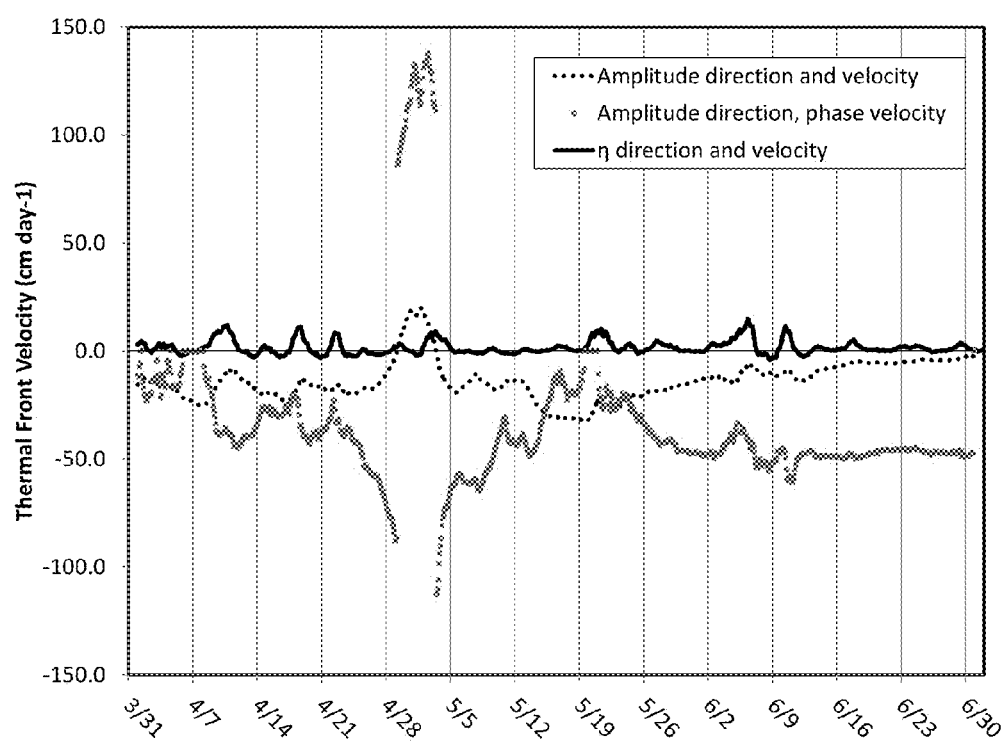
FIG. 21 illustrates velocity over time estimated from one sensor at the surface and another placed 20 cm below it using three procedures 1) using equation (9) to determine flow direction and velocity, 2) using equation (9) to determine direction and (10) to estimate velocity, and 3) using $\eta$ to estimate direction and velocity (equation (60)). When the actual fluid velocity is nominally constant but the amplitude ratio decreases, the phase shift increases, which can lead to opposite estimates in the magnitude of velocity depending on the direction of the mis-estimation and the direction of flow. There were a few instances where the phase did not yield a real root, and therefore was estimated at 0 velocity.

When using the phase change or amplitude ratio equations (9) and (10) to estimate flow direction and velocity assuming constant $\Delta z$, substantial errors may be generated if bed movement changes the amount of bed material between two sensors. FIG. 21 shows velocity estimates using three approaches from the downstream pool site of Gariglio [2012], who derived a time series of phase and amplitude of the temperature time series at the surface and at (nominally) 10 and 20 centimeters depth using dynamic harmonic regression in the Captain Toolbox [Taylor et al., 2007]. However, other techniques can be used to extract the phase and the amplitude of the signal such as discrete Fourier or wavelet analysis. One velocity estimate was obtained based on $\eta$ per equation (52) and an estimate of $\kappa_e$ from a time when depth was known; another was derived based just on equation (9), where the amplitude ratio indicated both direction and velocity, and a third was calculated using the flow direction indicated by the amplitude ratio, but a velocity determined from the phase change and equation (10). While the $\eta$-based velocity shows comparatively little variation in velocity, and is generally downwelling, the amplitude-based and phase-based velocities show strongly divergent patterns in velocity starting in mid-April. While it is tempting to consider such a pattern as being caused by poor parameter estimates applied within equations (9) and (10), the $\eta$-based velocity is not affected (except in the scaling of the left axis) by estimates of $\kappa_e$. FIG. 21 then focuses the question to ask why estimates from equations (9) and (10) would show marked and divergent changes despite comparatively minor fluctuations in the actual velocity.

Figure 22:
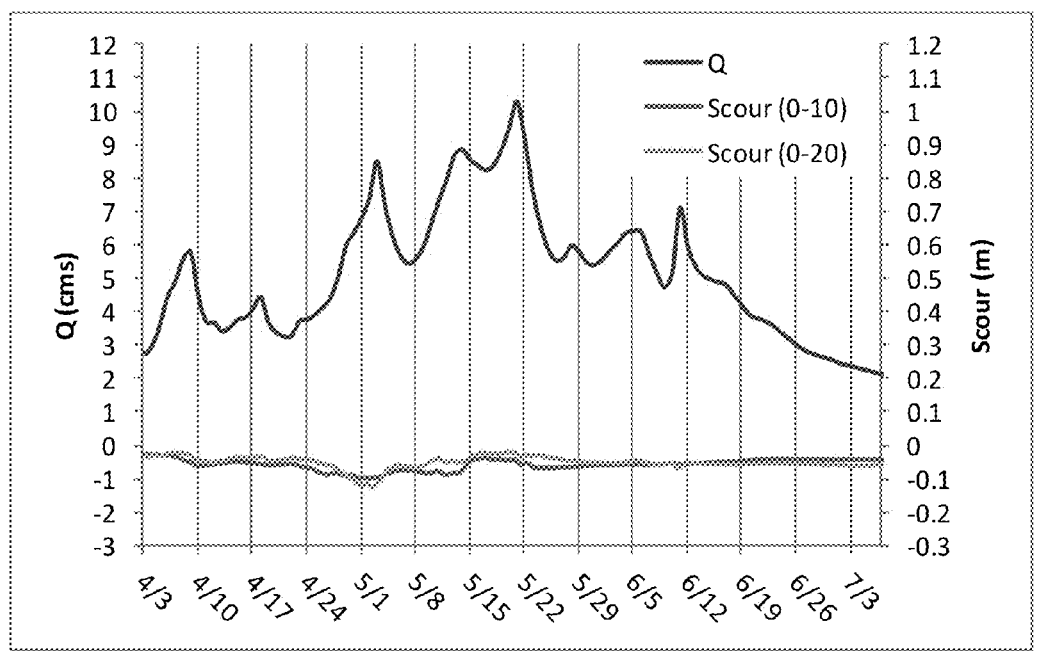
FIG. 22 provides estimated scour (from equation (57)) at a downstream pool location using a surface temperature sensor and a sensor placed 10 centimeters and 20 centimeters below it plotted with an estimated hydrograph for the site. The hydrograph is estimated from the nearby Valley Creek gage station (13295000) based on a historical relationship with the gage on Bear Valley Creek near Cape Horn (13309000) rescaled to the basin area of site.

The only time varying process that is consistent with all of these patterns is that the bed elevation dropped and refilled. The downstream pool area contained sand to some unknown depth, so it is a physically reasonable explanation as well. FIG. 22 shows a scaled reconstructed hydrograph (based on a relationship between a historical downstream gage and a modern gage in an adjacent basin) along with the imputed scour from equations (57) and (64a) based on the difference in the time series at the surface and the time series at either 10 or 20 cm below the first sensor. The general timing of the estimated scour is consistent with the hydrograph. While there are qualitative similarities to the more abrupt changes in estimated scour based on the 10 and 20 centimeter sensors, the temporal pattern from the 10 centimeter sensor matches expectations of sediment transport better, and the disagreements may be related to heterogeneity (sand vs gravel) in sediments above and between the sensors.

J. Validation

How well these equations can be used to characterize hyporheic properties from a fairly natural experiment can be tested. As flows and temperatures change in a stream over time, fluid velocity as well as the magnitude of the surface boundary conditions is expected to change, but the diffusive properties of the streambed would be expected to remain relatively constant. One test of the equations is whether the estimate of $z_d$ stays constant across seasons despite substantial changes in temperature and sometimes streambed fluxes. Equivalently, one could do this with $\kappa_e$ estimates; $z_d$ comparisons were selected to allow for easier presentation of uncertainty.

Figure 23:
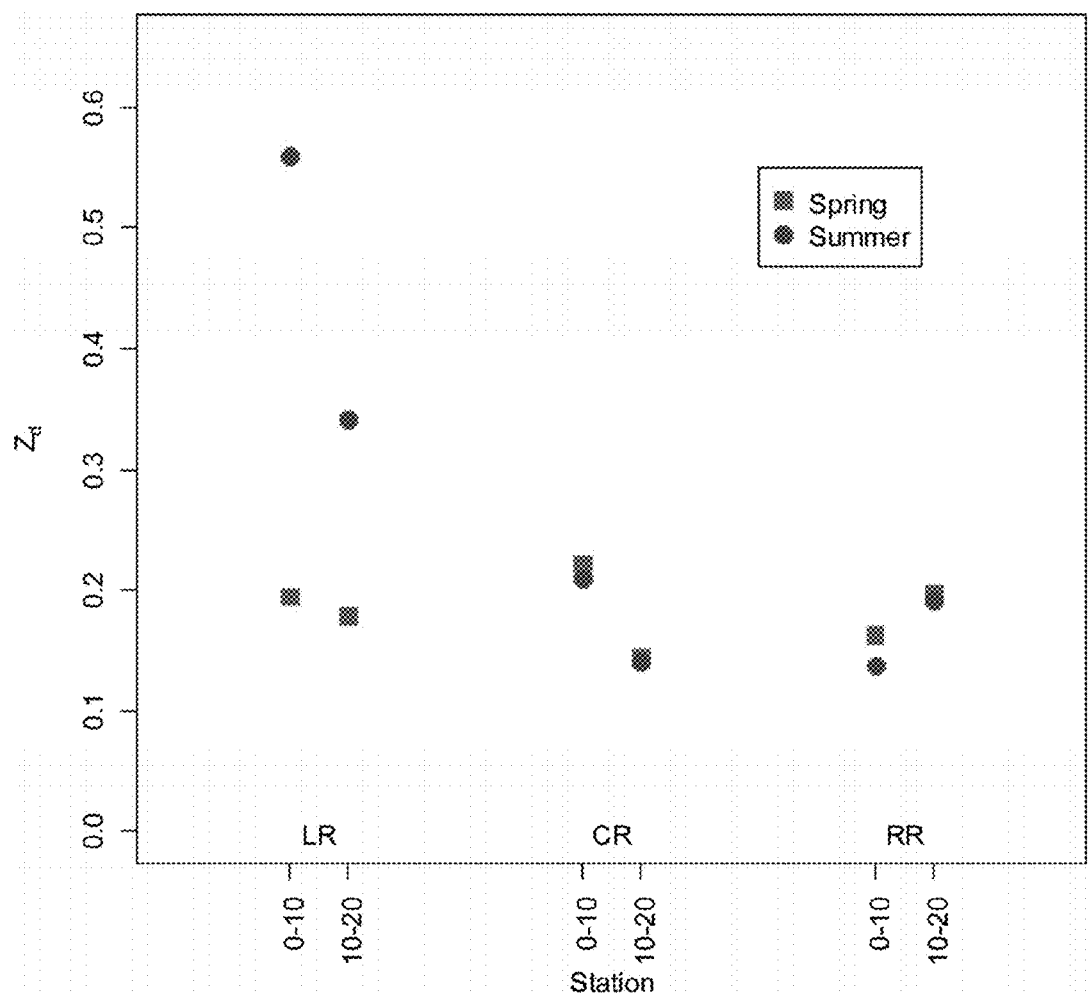
FIG. 23 provides damping depth estimates at three wells for spring and summer. The physical separation of the sensors was nominally 10 cm+/−1 centimeter except at LR, where approximately 3 centimeters of sediment were scoured around the well during spring flows. For reference, when $z_d=0.2$, $\kappa_e=1.45\times10^{-6}$.

Data from three wells arrayed across a riffle from the Gariglio [2012] were analyzed. Comparison of $z_d$ values estimated from a period during the spring and a period during the summer for three wells with sensors at nominally 0, 10, and 20 centimeters below the streambed surface is shown in FIG. 23. One well had scour of about 3 centimeters near the surface, which may contribute to the error, but the measurements there illustrate potential theory or measurement errors even at depths below the scour, so we include it in this discussion. Recall that the sensor separation was approximately 10 centimeters, and values of $z_d$ are between 15 and 20 centimeters; so errors of damping depth should be on the order of 1.5 to 2 times the accuracy of the physical measurement of actual depth, which was O(1 centimeter), assuming that $\Delta z$, is the most likely source of error. For most of these measurements, there is good agreement between spring and summer estimates of $z_d$ despite a 1.5-2° C. change in the surface temperature amplitude, slight changes in hyporheic fluid velocity, and substantial changes in the stream flow.

During summer the site labeled "LR" (for left riffle) experienced large downwelling velocities, and both phase and amplitude differences were very small. The large difference in estimated damping depth could be a result of instrument error. However, errors at both depth increments could not be simultaneously satisfied by errors in one instrument, so the errors could relate to deficiencies in the theory as well. Two potential examples are 1) that near the streambank, horizontal flow exchanges are large enough to substantially affect the amplitude or timing [e.g. *Lautz*, 2010] or 2) at high velocities the assumption that water and sediment temperatures are the same at a particular depth may be violated, particularly if large clasts are present. More specifically, the equations do not require sediment and water temperatures to be the same; however, the equations estimate the average temperature of sediment and water, and the water temperature was measured. It would be complex to assess the first issue, particularly with the paucity of independent measurements at this site, however the second mechanism would be consistent with the direction of the observed differences, where the larger rocks would not pull as much heat from the passing water making it appear that the heat was diffusing downward faster than the velocity would account for. The site has a large Peclet number, $P_e \approx 5.1$, and the sensitivity to measurements as outlined in FIGS. 12-19 is such that one would question whether the measurements taken were suited to those particular conditions as well. Indeed, the measurement with larger separation did show better performance. The measurements were not taken with the intention of validating the equations, nor were they taken with benefit of the understanding provided in the preceding section on measurement errors. The key ideas taken from this validation exercise are 1) that the new equations outlined here provide a ready method to check measurements, and 2) that comparison of these equations with more precise and complete measurements, particularly measurements that could independently verify them, could be illuminating in finding limits to their applicability.

III. Method for Determining Scour and Deposition in a Body of Water

Luce, et al. [2013] present a set of new analytical solutions to the 1-dimensional heat transport equation with sinusoidal boundary condition, which represents the daily temperature oscillations of stream waters, at the water-sediment interface and constant temperature at the other lower depth boundary [Hatch et al., 2006; Keery et al., 2007]. The new solutions quantify both water fluxes and the streambed sediment effective thermal diffusivity, $\kappa_e$, from measured paired temperature time series of water at two depths in the streambed sediment through the following dimensionless number:

$$\eta = \frac{-\ln\left(\frac{A_2}{A_1}\right)}{\phi_2 - \phi_1} = \frac{-\ln(A_r)}{\Delta\phi} \quad \text{Equation 1}$$

where the subscripts 1 and 2 indicate the sensor at the shallow and deep locations in the sediment and A and $\phi$ are the temperature signal amplitude and phase, respectively. The new dimensionless number is only a function of measured quantities from which water flux, v, and $\kappa_e$ can be quantified with the following equations:

$$v = \frac{\omega \Delta z}{\gamma \Delta \phi} \frac{1-\eta^2}{1+\eta^2} \quad \text{Equation 2}$$

$$\kappa_e = \frac{\omega \Delta z^2}{\Delta \phi^2} \frac{\eta}{1+\eta^2} \quad \text{Equation 3}$$

where $\gamma = \rho_m c_m / (\rho_w c_w)$ with $\rho$ and c the density and the specific heat capacity of the sediment-water matrix, subscript m, and of the water, subscript w, respectively, $\omega = 2\pi/P$ with P the period of the signal (1 day) and $\Delta z$ is the depth of sediment between the two sensors. This distance has historically been assumed to be known and time-invariant [e.g., Hatch et al., 2006; Keery et al., 2007; Lautz, 2010].

Most are familiar with the idea that temperature fluctuations on the inside of a wall have lower amplitude and are lagged compared to the fluctuations on the outside of the wall, and that the degree of damping and lag are functions of the thermal diffusivity of the wall and its thickness. The analogy between this and streambed sediment is fairly straightforward except for the movement of water carrying heat, which would seemingly confound the use of similar data to imply anything about the thickness or thermal properties of the bed. Rearranging Equation 3, however, demonstrates the separability of the diffusive terms (thickness and diffusivity) from the measured quantities on the right, including the relative velocity information carried implicitly in $\eta$.

$$\frac{\kappa_e}{\Delta z^2} = \frac{\omega}{\Delta \phi^2}\left(\frac{\eta}{1+\eta^2}\right) \quad \text{Equation 4}$$

So while Equation 3 allows the calculation of diffusivity if depth is known, the thickness of sediment for a known diffusivity also can be determined from $$\Delta z = \Delta \phi \sqrt{\frac{\kappa_e}{\omega}\left(1 + \frac{1}{\eta}\right)} \quad \text{Equation 5}$$

If diffusivity is known and taken to be time-invariant over the daily time scale, temporal variations in the sediment thickness can be determined using Equation 5.

Figure 24:
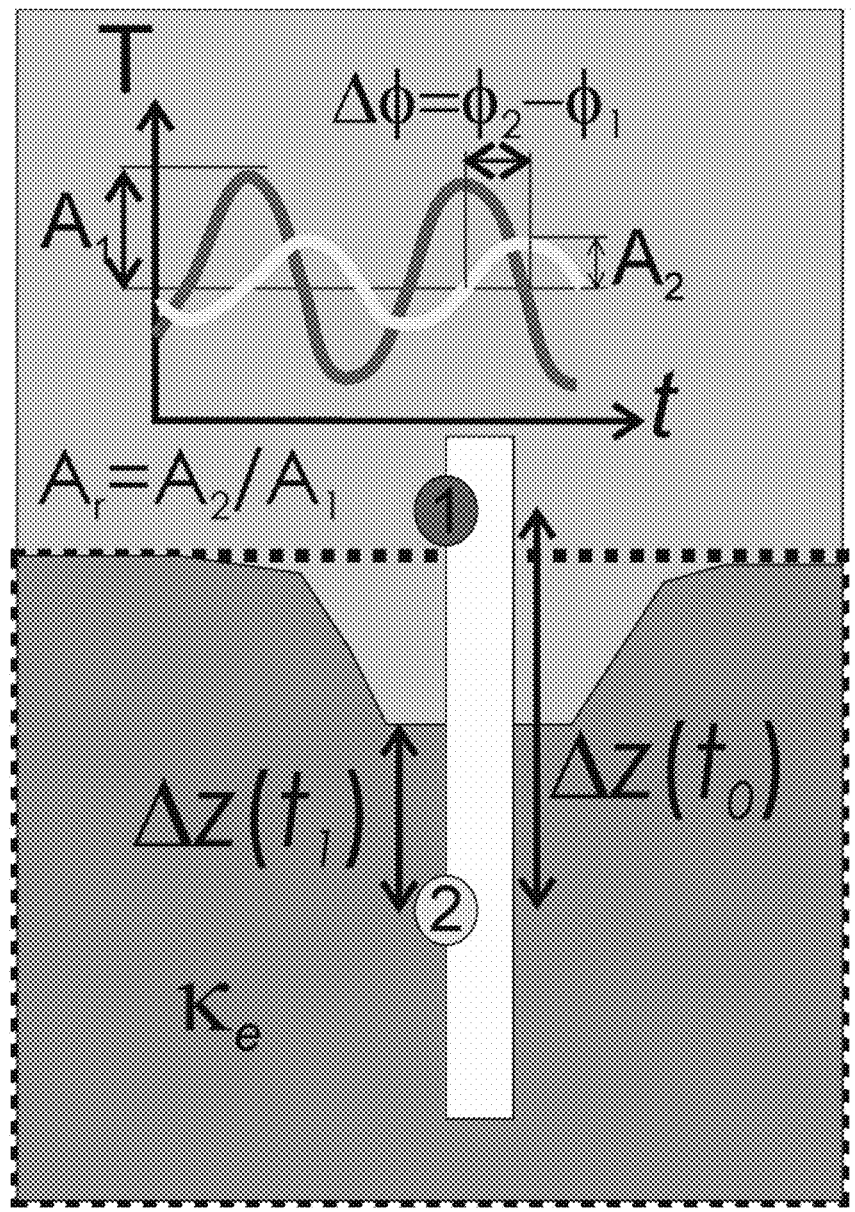
FIG. 24 is a schematic drawing illustrating streambed elevation change with the sediment thickness, $\Delta z(t)$, between sensors as a function of time and with $\kappa_e$ time-invariant.

Spatiotemporal changes in waterbed elevation, particularly streambed surface elevation, can be monitored with one temperature probe (sensor 1) measuring the in-stream water temperature and at least a first sensor, and potentially an array of sensors, that are embedded in the streambed sediment at given depths (FIG. 24). This method provides at least 4 pieces of information about the streambed environment: hyporheic vertical fluxes; hyporheic thermal regime; streambed effective thermal diffusivity; and changes in streambed elevation.

IV. Sensor and Sensor Array

FIG. 25 illustrates one embodiment of a probe/sensor assembly 10 according to the present invention. Probe/sensor assembly 10 comprises a probe 12 having at least a first temperature sensor 14 and at least a second temperature sensor 16. Certain working embodiments of a probe/sensor assembly have at least one additional temperature sensor 18. A working embodiment of probe/sensor assembly 10 used a 2.5-cm SDR 21 cold water PVC pipe as probe 12. Probe 12 was perforated at each thermal measurement depth, for example at 10 centimeters and 20 centimeters, to house a temperature sensor. One example of a working temperature sensor is Onset StowAway TidBiT, having a measurement range between −4 and 38° C., a resolution of 0.15° C. and an accuracy of 0.1° C. Temperature sensors 14, 16 and 18 can be housed in probe 10 at the selected thermal measurement depths using any suitable method. Sensors 14, 16 and 18 in a working embodiment included data storage capabilities to record temperature readings at known intervals for a desired time period. Thereafter, the probe/sensor assembly was retrieved and the stored temperature data downloaded for subsequent analysis. However, a person of ordinary skill in the art will appreciate that the sensors 14, 16 and/or 18 also could be capable of transmitting data in real time to a remote receiving station for analysis either at selected intervals, or continuously in real time. Moreover, fiber optic cables could be laid in the waterbed to measure temperature. Fiber optic temperature measuring techniques are known [see, for example, Selker, J. S., L. The venaz, H. Huwald, A. Mallet, W. Luxemburg, N. van de Giesen, M. Stejskal, J. Zeman, M. Westhoff, and M. B. Parlange (2006), Distributed fiber-optic temperature sensing for hydrologic systems, Water Resour. Res., 42, W12202, doi:10.1029/2006WR005326, which is incorporated herein by reference] and could provide spatially continuous information.

FIG. 26 illustrates a probe/sensor assembly 10 inserted into a river bed 20 in river 22 having a water surface 24. While the method is illustrated with reference to a river, the method is also readily applied to any water structure, such as canals, lakes, ponds, and oceans. Probe/sensor assembly 10 is inserted into the riverbed 20 so that the first probe 14 is positioned adjacent the water surface 24. More specifically, first probe 14 is positioned at a location within a water column of a surface body of water that is representative of the upper thermal boundary condition between surface water and pore water environments. Typically the surface water temperature is taken from a location within the water column that is close to the water-streambed interface, but fully surrounded by water (i.e. not buried or interacting with any streambed sediments). Placement of the first probe 14 is perhaps most important for large, deep bodies of water, as temperatures at the water surface could be different than temperatures at the surface water-sediment interface. The second temperature probe 16 is positioned at a selected depth below riverbed surface 26. While the depth of sensor 16 below the riverbed surface 26 is not critical, working embodiments typically set the depth of first temperature sensor 16 at about 10 centimeters below the riverbed surface 26. Second temperature sensor 18, and any additional temperature sensors on a probe/sensor assembly, is set at a known distance below sensors 14 and 16, such as a depth of about 20 centimeters below the waterbed.

A single probe/sensor assembly 10 can be used to practice disclosed embodiments of the present invention. However, probe/sensor assemblies 10 also can be used as an array. Probe/sensor assemblies 10 in an array are illustrated in FIG. 27, wherein the array comprises probe/sensor assemblies 10A, 10B, 10C and 10D. Arrays can be used for various purposes, such as to provide redundant data when located spatially relatively close to one another. Alternatively, arrays can be used to determine topological changes over a larger area by determining scour and/or deposition over the selected area, and then translating changes at each particular probe/sensor location into a map illustrating sediment depth changes over the area either at a particular time or as a function of time.

A person of ordinary skill in the art will appreciate that the sensors can be coupled to or under the control of a computer system. For example, the sensors 14, 16 and 18 can send data to a remote computer for storage and analysis. Such computers can include or can run a program for analyzing data received from the sensors 14, 16 and 18. For example, such software could perform at least the functions of receiving data and storing data. For a given sinusoidal time series, the software could also determine the amplitude ratio and phase differences between temperature data over a time period from a least a first probe 14 and a second probe 16. The software also could calculate the change in waterbed depth over a time period using embodiments of the method disclosed herein.

V. Working Example

The following example is provided to illustrate features of a certain working embodiment. A person or ordinary skill in the art will appreciate that the scope of the invention is not limited to those particular features exemplified.

Four temperature-monitoring probes were made with a 2.5-cm SDR 21 cold water PVC pipe perforated at each thermal measurement depth to house a temperature sensor, Onset StowAway TidBiT (measurement range between −4 and 38° C., resolution 0.15° C. and accuracy of 0.1° C.). The temperature sensor was in direct contact with the surrounding water or sediment-water matrix (depending on whether the temperature sensor is above or below the streambed-water interface). TidBit sensors were set 10 centimeters apart separated by Styrofoam material sealed with silicon to prevent any preferential flows within the pipe. One probe, set as the control probe, C0, housed 3 sensors whereas the treatment probes, T1, T2 and T3, had 2 temperature sensors each. No manual scouring process was applied at the control probe C0, and the streambed elevation was kept stationary, whereas a scouring process was applied treatment to probes T1, T2 and T3. TidBit sensors were calibrated before and tested after each scouring process in a temperature-controlled bath. A post-process analysis did not show any sensor measurements divergence from the calibration values; therefore, no thermal drift corrections were applied.

The probes were installed on a pool-riffle sequence of Warm Spring Creek, a small agricultural drainage channel and tributary of the Boise River, near the City of Boise, Id., with a recording interval of 5 minutes. The stream has low gradient (<0.001 millimeter$^{-1}$) median grain size finer than 0.004 meter, mean channel width of 1 m and mean water depth of 0.15 meter. The probes were placed in the sediment by inserting a long narrow bladed soil sampling shovel in the streambed sediments and displacing the sediment laterally while the pipe was inserted. The shovel was then withdrawn, allowing sediment to settle around the pipe.

The control probe C0 was buried approximately 0.25m from the right stream bank between the pool-tail and riffle crest. The topmost sensor was set flush to the water-sediment interface such that the sensors were monitoring water temperatures at 0 (in the stream), 10 and 20 centimeters below the streambed surface. The other probes T1, T2 and T3, were buried with the temperature sensors at 10 and 20 centimeters below the original streambed surface. T1 was placed at the same downstream location of probe C0 and 0.25m from the left bank; T2 and T3 were set along the center of the stream near the riffle crest and at the head of the pool, respectively. The probes were approximately 50 centimeters apart from each other. The fine sediment material allowed for an accurate measurement of streambed surface and of the relative positions of the temperature sensors.

Streambed surface elevation was measured around each probe and the water depth above the control probe weekly. The control probe did not have any measurable streambed surface elevation change. Conversely, a sequence of scour and filling procedures were applied at probes T1, T2 and T3, as reported in
Table 1.

TABLE 1

| Change in streambed elevation [m] | | | | Stream water stage |
|---|---|---|---|---|
| C0 | T1 | T2 | T3 | [m] |
| 0 | 0 | 0 | −0.005 | 0.07 |
| 0 | −0.05 | −0.055 | −0.06 | N/A |
| 0 | −0.01 | 0.003 | −0.01 | 0.15 |
| 0 | −0.06 | −0.05 | −0.05 | 0.13 |
| 0 | −0.005 | 0.002 | −0.005 | 0.14 |
| 0 | −0.005 | 0.002 | −0.005 | 0.17 |

Table 1 provides sequence of changes in streambed elevation imposed at each temperature probe (C0, T1, T2 and T3) and water stage above the control probe. A negative sign indicates lowering (scour) of the streambed surface elevation at the probe within approximately a 10 centimeter radius. The change in elevation imposed at each sensor remained constant until the next scouring process was applied. Scour was generated by removing the sediment around the probe within a radius of approximately 0.1 m by hand. The relative change of streambed surface elevation was measured from the top of each probe. Scouring was stopped once the streambed surface elevation was lowered by 0.05 meter from the original elevation. Deposition was simulated by filling the scour hole to the initial streambed surface elevation with the removed material. Streambed elevation measurements showed negligible changes from the imposed treatment due to settling of the sediment or filling of the sour at the treatment probes.

The vertical distance between two sensors $\Delta z$ has typically been assumed to be entirely filled with streambed sediment ($\Delta z(t_0)$ in FIG. 24). However, this is not the case when erosion processes scour streambed sediment leaving a section of the separation between sensors unburied, $\Delta z(t_1) < \Delta z(t_0)$, in FIG. 24). In this case, $\Delta z$ referred to in Equations (1) through (5) reduces to the thickness of the sediment remaining between the two sensors ($\Delta z(t_1)$, FIG. 24), and equation (5) can be used to solve for $\Delta z$. Equation 5 assumes that the sediment thermal properties, $\kappa_e$, are known. For example, the value of $\kappa_e$, could be quantified during a period when the streambed elevation is stable and $\Delta z$ is known, which could be based on an initial measurement. Thermal properties would be time invariant as long as the porosity of the streambed does not change substantially. If porosity were expected to change over time (as it ultimately did during this working example), a pair of probes that both stay buried (constant $\Delta z$) could be used to track shifts in thermal properties.

Each temperature sensor buried in the sediment was paired with the in-stream sensor of probe C0 to quantify the amplitude ratio and the phase shift between surface and subsurface water temperatures.

The amplitude and phase of the temperature signal was calculated with a discrete Fourier transform [described in Luce and Tarboton, 2010] using a 2-day window, but other techniques are available [e.g., Gordon et al., 2012; Keery et al., 2007; Swanson and Cardenas, 2010].

Figure 28:
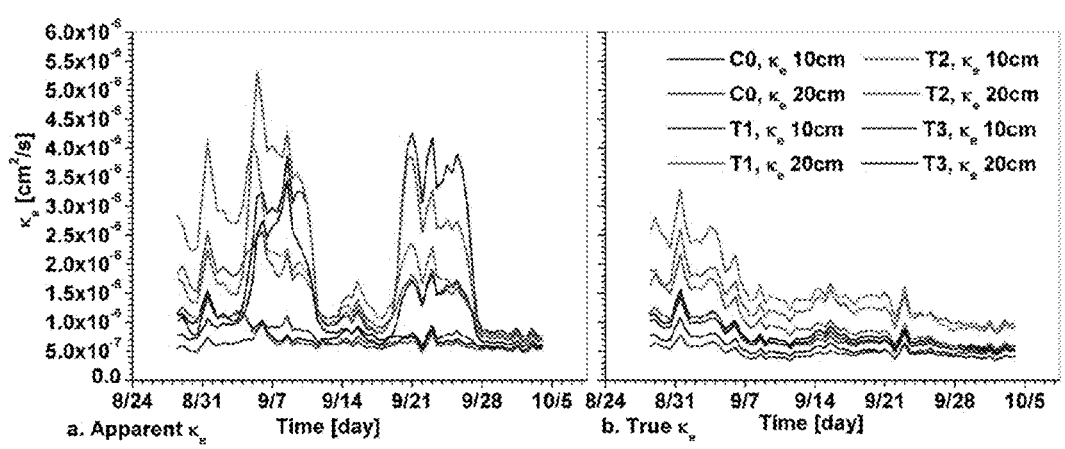
FIG. 28 provides plots of effective thermal diffusivity, $\kappa_e$, as a function of time for each temperature probe a) without (constant $\Delta z$) and b) with accounting for changes in streambed surface elevation ($\Delta z(t)$). The $\kappa_e$ values increase during scour periods for T1, T2 and T3 with no changes occurring at the control probe C0, and all sensors provided similar trends when accounting for scour.

Applying Equation (3) shows that unaccounted changes in sediment thickness, $\Delta z$, between sensors cause fictitious variations in i values (FIG. 28, sensors T1, T2 and T3). The apparent values of $\kappa_e$ estimated from the treatment probes show abrupt increases when the scour treatment was imposed (FIG. 28). These changes are larger at the shallow (10 cm) than deep (20 cm) sensors because of the larger fractional change in sediment thickness for the shallower sensor than for the sensor at greater depth (FIG. 28). Conversely, the sensors of the control probe C0 show small decreases in $\kappa_e$, which is due to the recovery of the streambed sediment from the disturbance caused by compacting and loosening the sediment when placing the temperature probes into the streambed. The effect of this disturbance last approximately 12 days after which $\kappa_e$ estimated with the probe C0 sensors at both 10 and 20 cm depth remains approximately constant. The estimated $\kappa_e$ values have approximately the same values at the shallower (10 cm) and deeper (20 cm) depths, indicating that thermal properties of the streambed are relatively constant within the superficial layer at the C0 sensor location (FIG. 28).

When the actual experimentally imposed $\Delta z$ is used in equation (3) for the treatment probes, true $\kappa_e$ values do not change abruptly but show a trend similar to that of the control probe C0 (FIG. 28). True $\kappa_e$ values estimated with the treatment sensors decrease slowly with time, as observed for the control probe C0, as the sediment returned to its pre-instrumentation condition. The recovery time lasts longer for the treatment sensors at deep than shallow depth. A time-invariant $\kappa_e$ is reached after approximately 12 and 26 days for the treatment sensors at 10 and 20 cm depth, respectively. The treatment operations themselves do not appear to be major contributors to true $\kappa_e$ temporal variations but they may have prolonged the persistence of the effect induced by the installation operation for the deep sensors. The effect is stronger for the deep than shallow sensors because a thicker layer of sediment needs to return to its pre-instrumentation condition. All sensors except probe T2 predict a similar true $\kappa_e$ by the end of the analysis period.

Because of the temporal changes in $\kappa_e$ for both control and treatment probes induced by their installation we could not use a constant value evaluated during the first part of the experiment with constant streambed surface elevations. $\kappa_e$ of the probe C0 was used as a reference value to account for temporal variation over the recovery period. Because the treatment sensors at a depth of 10 centimeters showed the same trend as the respective sensor of probe C0, we used the ratio of the $\kappa_e$ values averaged over the first week between sensor at C0 and those at T1, T2 and T3 at 10 centimeters to scale $\kappa_e$ of C0 over the entire period, $R = \kappa_{e,C0}/\kappa_{e,Ti}$, where i=1, 2 and 3. Thus the actual $\kappa_e$ for each treatment sensor at depth 10 cm was estimated as $\kappa_e$, Ti=R $\kappa_e$, C0. The sensors at 20 centimeters along the treatment probes present a more complex change of $\kappa_e$ over time due to the longer interval required to adjust after the disturbance induced by the installation. Thus, $\kappa_e$ values averaged during the first, middle and last week when the streambed surface was at the initial elevation were used to estimate the ratio between the control and the treatment sensors at 20 centimeters. A parabolic change of the ratio of $\kappa_e$ over time between the first and the last week of the experiment was used with constant ratios at the beginning and at the end of the experiment.

In a gravel bed river, the disturbance caused by probe installation has persisted up to 30 days in some locations. Thus, the recovery period may last between 12 and 30 days depending on grain size distribution, location of the probes and depth of the sensors. The length of this period can be estimated by monitoring $\kappa_e$ over time during a period with no erosion and deposition. If 15 days had passed before starting the treatment at probe T1, T2 and T3, constant $\kappa_e$ values we should have seen at the control and treatment probes. Consequently, the correction of $\kappa_e$ with the control probe would not have been necessary, but the constant $\kappa_e$ values reached at the end of the recovery period could have been used.

Figure 29:
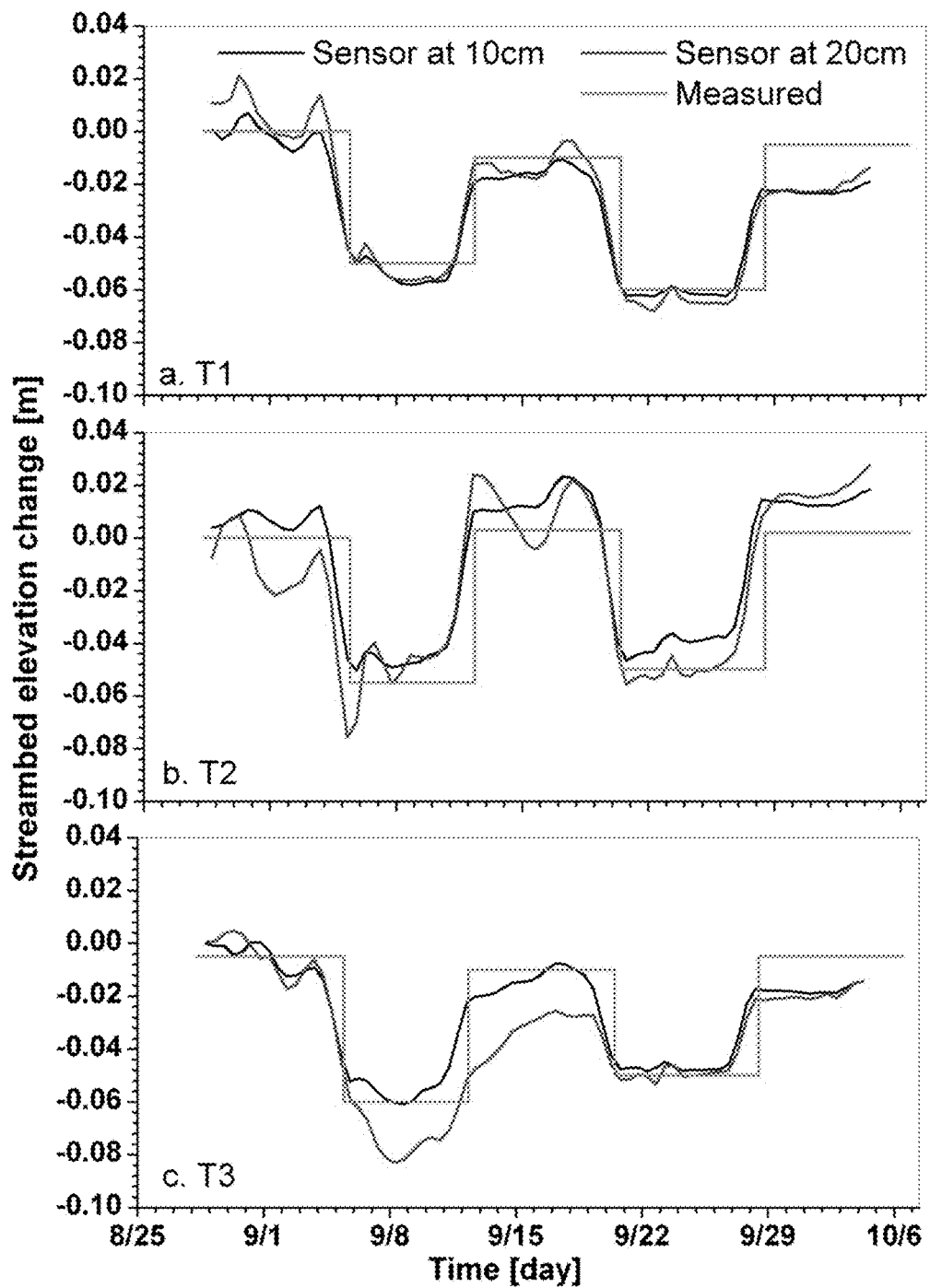
FIG. 29 provides measured and predicted changes in streambed surface elevation at a) T1, b) T2 and c) T3 probe. Changes were predicted using paired sensors between 0 and 10 centimeters and between 0 and 20 centimeters.
Figure 30:
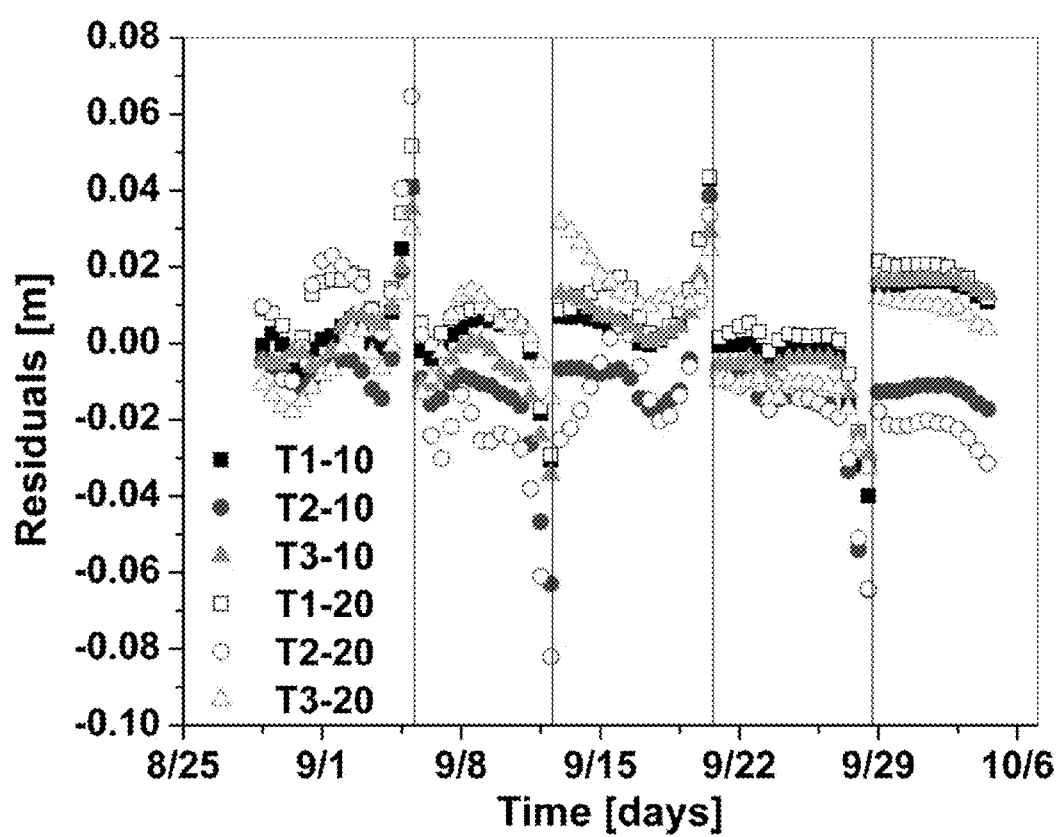
FIG. 30 provides residuals between measured and predicted scour/deposition, where the vertical lines indicate when treatment was applied.

Using the estimated values of $\kappa_e$ and equation (5) to quantify changes in streambed surface elevation provided a reasonable approximation of the imposed scour and fill treatments (FIG. 29), both sequence and magnitude. The largest residual errors, difference between predicted and observed elevations, are at the time of treatment application (FIG. 30). This is expected because the time scales of the applied erosion/deposition and the heat transport are different: the former is almost instantaneous in our case and the later has a daily time scale. Thus, the method should provide daily averaged scour/deposition information, which is remarkable compared to driven or buried rods such as scour-chain or magnetic collars, which only provide maximum scour and no information on deposition. Other techniques such as transducers systems or scanning sonars are expensive and affected by other limitations, which may include water quality [Mueller, 1998]. Root mean square errors calculated with 12-hour average are of the order of 1 centimeter, which is close to 20% error, which is good accuracy for daily scour/deposition predictions. The bias, which is the mean of the residuals, shows that there is a systematic error, which corrected may reduce the accuracy to 10% of these measurements. Table 2 provides root mean square (RMSE) and bias for each sensor calculated on 12 hours averaged values excluding values at transition.

TABLE 2

| Root Mean Square Error [m] | | | | | | Bias [m] | | | | | |
|---|---|---|---|---|---|---|---|---|---|---|---|
| T1-10 | T2-10 | T3-10 | T1-20 | T2-20 | T3-20 | T1-10 | T2-10 | T3-10 | T1-20 | T2-20 | T3-20 |
| 0.008 | 0.013 | 0.01 | 0.012 | 0.018 | 0.012 | −0.004 | 0.011 | −0.002 | −0.01 | 0.011 | −0.002 |

The predictions are more accurate with the shallow sensors than deep, which could be due to a better estimation of the thermal properties with the former than latter sensors. The lowest performance is for probe T2 at 20 centimeters, but it has also the largest bias. Probe spatial location within the streambed does not affect the performance, which depends only on the depth of the sensors. The calculated intra-gravel velocities switched from upwelling to downwelling during this working example as flow stage changed, supporting the fact that the method does not depend on one heat-transport processes but all three.

The results presented herein establish that paired temperature time series analysis can predict variations in streambed surface elevations on a desired time scale, such as daily. This technique also allows determining when a disturbance in the streambed ceases to affect the sediment properties and hyporheic hydraulics and the system has recovered.

By assuming that stream flow is not thermally stratified and spatially uniform within a reach, then a single probe can be used to measure water temperature coupled with an array of sensors buried in the waterbed. This allows spatial monitoring of temporal changes in waterbed elevation. When maximum scour is unknown, multiple sensors can be deployed at different depths such that one sensor will always be placed deeper than the maximum scour depth.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for monitoring waterbed environment, comprising:
   determining a first temperature of a body of water using a first temperature sensor at a first location adjacent to a surface of the body of water such that the first temperature sensor is fully immersed in water;
   determining at least a second temperature of a waterbed using a second temperature sensor at a second location at a first known depth below a waterbed surface; and
   determining change in the waterbed environment using the first and second temperatures.

2. The method according to claim 1 wherein the waterbed is a riverbed.

3. The method according to claim 1 wherein the waterbed environment comprises hyporheic vertical flux, hyporheic thermal regime, waterbed effective thermal diffusivity, change in waterbed elevation, or combinations thereof.

4. The method according to claim 1 comprising determining change in sediment depth in the body of water.

5. The method according to claim 4 for determining scour, deposition, or both.

6. The method according to claim 4 further comprising determining at least a third temperature at a third location at a second depth below the waterbed surface.

7. The method according to claim 4 comprising using at least 3 temperature sensors.

8. The method according to claim 1 comprising determining the first temperature within a water column of a surface body of water representative of an upper thermal boundary condition between surface water and pore water environments.

9. The method according to claim 1 wherein at least one of the first and second temperature sensors stores temperature data over time.

10. The method according to claim 1 wherein at least one of the first and second sensors sends data to a remote recording station.

11. The method according to claim 1 wherein temperature data is received, stored and analyzed by a computer.

12. The method according to claim 1 comprising using a probe/sensor assembly that includes a probe having the first and second temperature sensors associated therewith.

13. The method according to claim 12 where the method further comprises inserting the probe into the waterbed to locate the second temperature sensor at the first known depth relative to the waterbed surface.

14. The method according to claim 12 comprising using plural probe/sensor assemblies in an array.

15. The method according to claim 1 comprising using plural sensors in an array.

16. The method according to claim 1 wherein at least one of the first and second temperature sensors is a fiber optic cable.

17. A probe/sensor assembly, comprising:
a probe; and
a plurality of temperature sensors, comprising
a first water temperature sensor and a second waterbed temperature sensor associated with the probe, a distance between the first water temperature sensor and the second waterbed temperature sensor sufficient to locate the first water temperature sensor within a water column of a surface body of water representative of an upper thermal boundary condition between surface water and pore water environments, and to locate the second waterbed temperature sensor at a first known depth below a waterbed surface.

18. The probe/sensor assembly according to claim 17, wherein the plurality of temperature sensors further comprises a third temperature sensor associated with the probe, a distance between the first water temperature sensor and the third temperature sensor being sufficient to locate the third temperature sensor at a second known depth below the waterbed surface.

19. The probe/sensor assembly according to claim 17 wherein the plurality of temperature sensors record temperature readings at known time intervals for a desired time period.

20. The probe/sensor assembly according to claim 17 wherein the plurality of temperature sensors transmit data to a remote receiving station at selected time intervals, or continuously in real time.

21. The probe/sensor assembly according to claim 17 further comprising a computer to receive data, store data, and/or determine changes in waterbed environment using temperature data.

22. An array comprising plural probe/sensor assemblies according to claim 17.

23. The probe/sensor assembly according to claim 17, consisting essentially of the probe and the plurality of temperature sensors.

24. A method, comprising:

placing a first probe comprising a first temperature sensor and a second temperature sensor in a waterbed such that the first temperature sensor is fully immersed in water and is located at a first location within a first water column, the first location being representative of an upper thermal boundary condition between surface water and pore water environments, and the second temperature sensor is located at a second location at a first known depth below a waterbed surface;

placing a second probe comprising a third temperature sensor and a fourth temperature sensor in the waterbed such that the third temperature sensor is fully immersed in water and is located at a third location within a second water column of the surface body of water, the third location being representative of an upper thermal boundary condition between surface water and pore water environments, and the fourth temperature sensor located at a fourth location at a second known depth below the waterbed surface;

recording temperatures from the first, second, third and fourth temperature sensors; and determining change in a waterbed environment using the recorded temperatures.

\* \* \* \* \*